(12) United States Patent
Houle

(10) Patent No.: US 9,742,049 B2
(45) Date of Patent: Aug. 22, 2017

(54) GRAVOLTAIC CELLS

(71) Applicant: Douglas W. Houle, Clinton Township, MI (US)

(72) Inventor: Douglas W. Houle, Clinton Township, MI (US)

( * ) Notice: Subject to any disclaimer, the term of this patent is extended or adjusted under 35 U.S.C. 154(b) by 0 days.

(21) Appl. No.: 15/240,138

(22) Filed: Aug. 18, 2016

(65) Prior Publication Data
US 2016/0359212 A1    Dec. 8, 2016

Related U.S. Application Data

(63) Continuation-in-part of application No. 13/986,536, filed on May 14, 2013, now abandoned, and a continuation-in-part of application No. 12/658,562, filed on Feb. 11, 2010, now abandoned.

(60) Provisional application No. 61/689,835, filed on Jun. 14, 2012, provisional application No. 61/210,133, filed on Mar. 16, 2009, provisional application No. 61/207,606, filed on Feb. 17, 2009.

(51) Int. Cl.
*H01M 14/00* (2006.01)

(52) U.S. Cl.
CPC ....... *H01M 14/00* (2013.01); *Y10T 29/49108* (2015.01)

(58) Field of Classification Search
None
See application file for complete search history.

*Primary Examiner* — Daniel Gatewood
(74) *Attorney, Agent, or Firm* — Gerald R. Black, Esq.

(57) ABSTRACT

Gravoltaic cell devices and methods are disclosed for producing robust electrochemical gravoltaic cells that convert a gravitational force into electrical energy. The cells includes a reaction vessel and a first stationary homogeneous volume of dissociated aqueous cations and a second stationary homogeneous aqueous volume of dissociated aqueous reactant cations, both volumes being disposed within the reaction vessel, and providing bulk solvent and anions a stationary bulk volume of a homogeneous mixture of solvent and dissociated anions collectively disposed homogeneously throughout the two layers of dissociated aqueous cations. The cell also includes an anode junction providing electrochemically active dissimilar anode/cation chemical species junction. The cell also includes a cathode junction providing a gravity-sustained electrochemically passive similar cathode/cation chemical species junction. One of the several purposes of the present invention is to further study and define said properties and to develop longer lasting interfaces.

20 Claims, 24 Drawing Sheets

GRAVOLTAIC CELLS

This Application is a Continuation-In-Part and claims priority to U.S. patent application Ser. No. 13/986,536 (Houle), entitled "Gravoltaic Cells", filed on May 14, 2013; U.S. Provisional Application No. 61/689,835, entitled "Gravoltaic Cells" filed on Jun. 14, 2012; U.S. patent application Ser. No. 12/658,562 (Houle), entitled "Gravoltaic Cell" filed on Feb. 11, 2010; U.S. Provisional Application No. 61/210,133 (Houle), entitled "More Electrochemical Baro-Diffusion Cells" filed on Mar. 16, 2009; and U.S. Provisional Application No. 61/207,606 (Houle), entitled "Electrochemical Baro-Diffusion Cells" filed on Feb. 17, 2009.

FIELD OF THE INVENTION

The present invention relates to electrochemical gravoltaic cells, and more particularly, to devices and methods for producing robust and long-lived electrochemical gravoltaic cells that convert a gravitational force into electrical energy.

BACKGROUND OF THE INVENTION

U.S. Pat. No. 715,654 (Friend) teaches a gravity cell using of a porous partition placed between the upper layer of zinc sulfate electrolyte and the lower layer of copper sulfate electrolyte to prevent the two electrolytes from mixing together during periods of inactivity. "To these ends I divide the cell horizontally into two compartments, containing, respectively, the positive and negative elements of the battery, by a partition adapted to prevent the solid particles of matter from passing from one element to the other, but at the same time permitting the proper and necessary communication between the positive and negative compartments to sub serve the best results or produce the maximum efficiency. The separating partition or disk may consist of pasteboard or other suitable material possessing the absorbent or porous property or forming a filter against the passage of solid particles."

However, said partition placed between the two half cells acts as a resistance force to the motion of the charge carriers thus increasing the internal cell resistance resulting in diminished output current. The preferred embodiments of the present invention do not utilize porous barriers.

However, the gravity cell disclosed in U.S. Pat. No. 715,654 (Friend) has the disadvantages of:
  a. An eroding zinc anode that requires periodic replacement from the outside world;
  b. The eroding zinc anode causing a buildup of excess zinc sulfate solution within the cell that requires removal to the outside world; and
  c. Consumption of copper from the copper sulfate solution as copper is plated out onto the copper cathode, requiring the addition of more copper sulfate crystals from the outside world.
  d. Buildup of plated copper onto the cathode requiring removal to the outside world.
  e. Diminished output current per cross sectional area due to the use of a partition to keep the two electrolytic solutions separate. Said partition increases the internal cell resistance and therefore reduces the available electrical current per given cell.
  f. The electric energy produced does not come from gravity but rather comes from the oxidation of the zinc anode.

Energy from the outside world went into the zinc anode during the refining of zinc ore into zinc metal. The zinc anode stores this energy of refining as stored potential energy within the pure zinc anode. The stored potential energy is released back to the outside world as electric energy by way of oxidizing the zinc metal anode back into the zinc ore zinc sulfate. Gravity by way of buoyancy forces does the work of maintaining the stratification of the two electrolytes.

A galvanic cell in which the chemical energy converted into electrical energy is arising from the concentration difference of a single chemical species electrolyte at the two electrodes of the cell. An example is a divided cell consisting of two silver electrodes surrounded by silver nitrate electrolytes of different concentrations. Nature will tend to equalize the concentrations. Consequently, silver cations will be spontaneously reduced to silver metal at the electrode (cathode) in the higher concentration electrolyte, while the silver electrode (anode) in the lower concentration electrolyte will be oxidized to silver cations. Electrons will be flowing through the external circuit (from the anode or negative electrode to the cathode or positive electrode) producing a current, and nitrate anions will diffuse through the separator. This process will continue till the silver nitrate concentration is equalized in the two compartments of the cell. However, the voltage output of the cell decreases as the silver nitrate concentration gradient becomes equalized in the two compartments of the cell making the concentration cell unusable in situations that need a constant voltage output voltage source.

U.S. Pat. No. 6,746,788 (Borsuk) states that, "Concentration cells utilizing external fields" teaches "The embodiments in both FIGS. 3A and 3B can be thermally reconditioned for repeated generation of electricity by exposing the cells to a cold temperature reservoir. This thermal processing reduces the solubility of the salt in electrolyte, causing the precipitation or reformation of solid 38, thus returning the cells to their original conditions." "When the temperature of the cell is increased, the solubility of the salt is increased in the aqueous electrolyte. As solid 38 dissolves into electrolyte, sub volumes of electrolyte that are localized around the salt attain a temporarily higher solute concentration compared to regions or sub volumes of the electrolyte that are distant from the dissolving salt."

A cold temperature applied to a saturated or near saturated electrolyte solution causes the solute to precipitate out of the solution and gravity causes the precipitating solute to collect in a low area of the solute/solvent container. When heat is applied to the electrolyte solution, the precipitated solute at the low area of the solute/solvent container re-dissolves into the electrolyte solution causing the re-dissolving solute to diffuse uniformly throughout the solvent, wherein "the free energy of the diffusion reaction may be used to generate electricity."

For the Borsuk reference, energy is expended drawing out heat energy from the electrolyte solution to cause the solute to precipitate out of solution; and more energy is expended reheating the electrolyte to re-dissolve the precipitated solute back into solution to drive the diffusion reaction, wherein it is movement of heat energy rather than gravitational energy that is being converted to electricity. The Borsuk device uses more energy to drive the precipitation and dissolving process than it produces in electric energy.

The gravoltaic cell of the present invention is a transducer that converts gravitational force, by way of buoyancy forces, into electromotive force strong enough to push electrons through an external electric load resistance.

For galvanic cells, it is desirable to have both 1) the largest possible electrochemical junction disparity between the anode of a first chemical species and the compartmentalized homogeneous stationary volume of dissociated aqueous reactant cations of the second chemical species in immediate contact with the surface of the anode of the first chemical species and 2) the highest possible number of reactant cations of the second chemical species in immediate contact with the surface of the anode of the first chemical species. Meeting both these conditions provides the large electrochemical junction disparity needing to produce useful anode-reactant cation reactions that produce useful electromotive force, while at the same time provides a sufficiently high number of reactant cations to react with the anode to produce useful electrical current.

A concentration cell is a limited form of a galvanic cell that has two equivalent half-cells (or compartments) of the same aqueous reactant chemical species differing only in concentrations, but not in chemical species, in contact with two electrodes of the same chemical species as the reactant chemical species. A concentration cell is a limited source of electrical energy because it fails to provide any chemical species disparity at the junction between the anode and the reactant cation volume in contact with the anode.

A concentration cell is a limited source of electrical energy because it fails to provide a high concentration of reactant cation chemical species in contact with the anode, relative to the concentration of reactant cation chemical species in contact with the cathode.

A concentration cell requires a concentration difference of 10 times or greater of the single reactant chemical species to produce 30 millivolts (with luck) at room temperature, this is an unlikely event in a single container limited to gravitational and or magnetic forces.

In order to provide a good electrochemical junction disparity between the anode of one chemical species and the similar reactant cation volume of the same chemical species, the concentration of reactant cations must be very small, that is, a large concentration of one chemical species within the anode and a small concentration of the same chemical species within reactant volume, which in turn severely limits the number of chemical reactions occurring between the anode and the reactant volume at the interface between the anode and the reactant volume, and limits the total electrical current available to an external electrical load. On the other hand, in order to provide a good concentration of reactant cation chemical species in contact with the anode, the concentration of reactant cations must be near saturation, which in turn severely limits the concentration disparity between the anode and the reactant cation volume, which in turn severely limits the junction potential or voltage available to an external electrical load. The concentration disparity has the inherent problem of having two limitations working at cross purposes.

A concentration cell produces a small voltage as it attempts to reach concentration equilibrium of the aqueous reactant. This equilibrium occurs when the concentration of a single reactant in both cells are equal. Because an order of magnitude concentration difference of the single reactant produces less than 30 millivolts at room temperature, concentration cells are not typically used for energy storage. Specifically, a concentration cell is a limited form of a galvanic cell because it utilizes an electrochemically passive similar anode/cation concentration junction disparity between an anode of the first chemical species and a reactant cation volume of the first chemical species.

U.S. Pat. No. 8,288,995 (Jimbo, et al.) states that "As has been described above, since the amount of electrolyte in a valve-regulated lead-acid battery is lower than that in a fluid-type lead-acid battery, it is difficult to alleviate differences in sulfuric acid concentration between the bottom and top of the battery (difficult to diffuse $SO_4^{2-}$). In particular, as shown in FIG. 7, in the case of a valve-regulated lead-acid battery in which the positive electrode and negative electrode height is 100 mm or more, it becomes particularly difficult to alleviate the difference in sulfuric acid concentration between the bottom and top of the battery, thereby resulting in prominent stratification and lowering charge acceptance particular in low-temperature environments. In addition, high-rate charging using large current values becomes difficult." However, the '995 patent teaches that it is difficult to alleviate the difference in sulfuric acid concentration between the bottom and top of the battery by diffusion.

U.S. Pat. No. 4,565,748 (Dahl) states that; "Large lead-acid batteries suffer from the problem of electrolyte sulfation and stratification. When a cell is charged, acid is formed at the plates and this more dense acid tends to sink to the bottom of the cell. In tall cells, where diffusion is insufficient to overcome the density gradient, it is necessary to provide some mechanical agitation in order to circulate the electrolyte and maintain a homogeneous electrolyte. However, the '748 patent teaches that in tall cells diffusion is insufficient to overcome the density gradient.

Practical and convenient cells are needed for producing robust and long-lived electrochemical cells for generating electrical power and delivering said electrical power to an external workload. Several approaches have been proposed, but none have found commercial acceptance.

What is needed is a gravoltaic cell that provides an electrochemically active chemical species disparity between the anode of a first chemical species and a reactant cation volume of a second chemical species. What is needed is a gravoltaic cell that utilizes positive and negative buoyancy to sustain electrochemically active chemical species disparity between an anode of the first chemical species and the reactant cation volume of the second chemical species. What is needed is a gravoltaic cell that plates out the eroded and dissolved anode chemical species onto the cathode, wherein the anode and the cathode may be interchanged thus eliminating the need to add new anode material to the system from the outside world, where neither the cell body nor the cation volumes are inverted.

What is needed is a gravoltaic cell that plates out excess dissolved anode chemical species onto the cathode at the same rate as anode material is being dissolved into solution at the anode, resulting in a fixed amount of anode cations within the cell, thereby eliminating the need to remove material from or add material to the outside world. What is needed is a gravoltaic cell that maintains a fixed amount of cations within the cell, thereby eliminating the need to remove material from or add material to the outside world. What is needed is a gravoltaic cell that has the ability to interchange the two electrodes as mass is transferred from the anode to the cathode, thereby eliminating the need to remove material from or add material to the outside world.

SUMMARY OF THE INVENTION

The gravoltaic cells of the present invention address these needs.

The method of creating a gravoltaic cell of the present invention converts gravitational force into electrical energy. The method comprises:

1. Providing a driving disparity at the junction between a stationary anode of a first chemical species and a homogenous stationary reactant cation volume of a second chemical species in contact with the surface of the anode of the first chemical species. The driving disparity is a chemical species disparity between a stationary anode of a first chemical species in contact with a stationary homogenous reactant cation volume of a second chemical species, as opposed to the moving (from a high concentration to a low concentration) inhomogeneous molar concentration disparity of a single reactant chemical species utilized by the typical concentration cell. A stationary anode of the first chemical species and a stationary homogenous reactant cation volume of said second chemical species are separate and in contact with each other wherein both elements are in the same compartment of the same reaction vessel. Having two separate stationary elements, the anode and the reactant cation volume, in the same compartment of the reaction vessel is a highly non-random event and as a result, the two elements form a high potential energy junction. The system will attempt to lower the potential energy by dissolving the stationary anode into the stationary homogenous reactant cation volume within said compartment of said reaction vessel to form a uniform stationary homogenous volume throughout. At the surface of the stationary anode, atoms of the first chemical species on the surface of the anode oxidize and dissolve into solution into the stationary homogenous reactant cation volume of the second chemical species as liberated cations of said first chemical species. The liberation of the cations of the first chemical species has the effect of displacing the reactant cations of the second chemical species in immediate contact with the surface of the anode of the first chemical species away from the surface of the anode of the first chemical species. Said displacement has the effect of pushing reactant cations of the second chemical species that are in immediate contact with the surface of the anode of the first chemical species away from the surface of the stationary anode of the first chemical species. Said displacement causes said reactant cations of the second chemical species to lose contact with the surface of the anode of the first chemical species. Said displacement has the effect of reducing the junction chemical species disparity at the junction between the anode of the first chemical species and the reactant cation volume of the second chemical species. Gravitational force, through the action of positive buoyancy and negative buoyancy causes a migration of said liberated cations of said first chemical species through said compartmentalized homogeneous stationary dissociated aqueous reactant cations of the second chemical species away from said anode of said first chemical species. Said migration allows fresh reactant cations of the second chemical species to reconnect with the anode of the first chemical species and again contact the surface of the anode of the first chemical species thus increasing the junction chemical species disparity at the junction between the anode of the first chemical species and the reactant cation volume of the second chemical species. Thus through the combined actions of positive buoyancy and negative buoyancy said chemical species disparity between the anode of the first chemical species and the reactant cation volume of the second chemical species is sustained.

2. Providing an electrochemically active anode junction chemical species disparity at a junction between a stationary anode of the first chemical species and a stationary homogenous reactant cation chemical species volume of a second chemical species in immediate contact with the surface of the anode, comprising a stationary anode of said first chemical species having a first placement and in contact with a first stationary homogeneous volume of dissociated aqueous reactant cations of the second cation chemical species having a first placement. The first placement of the first stationary homogeneous volume of a reactant cation volume of a second chemical species is maintained by gravity by either negative buoyancy or positive buoyancy.

The first placement of the stationary homogeneous volume of a reactant cation chemical species volume of a second chemical species occupies an upper compartment of the reaction vessel for the negative buoyancy embodiment of the present invention, and the first placement of the stationary homogeneous volume of a reactant cation chemical species volume of a second chemical species occupies the lower compartment of the reaction vessel for the positive buoyancy embodiment of the present invention.

As used herein, the following definitions of terms apply.

The term 'buoyancy' means the ability or tendency of an object to float in water or air or some other fluid; the process of buoyancy assumes two separate components, a buoyant object to float and a less buoyant fluid to float on.

The term 'first chemical species' means the chemical species comprising the anode 25, the cathode 5 and the reference cations C1 of the reference electrolyte 9 (for example copper species or aluminum species or zinc species etc.).

The term 'second chemical species' means the chemical species comprising the reactant cations C2 of the reactant electrolyte 29 (for example copper cation species or calcium cation species or aluminum cation species or zinc cation species etc.).

The term 'stationary volume' means the volume of electrolyte not moving and not intended to be moved.

Anode 25 and the cathode 5 may be composed of any electrically conductive chemical species that can undergo oxidation and reduction reactions, wherein the anode 25 and cathode 5 are comprised of the same chemical species, and wherein the reference electrolyte 9 includes cations C1 of the same chemical species as the anode 25 and cathode 5.

The term 'more buoyant electrolyte' means the electrolyte that floats on top of the less buoyant electrolyte.

The term 'less buoyant electrolyte' means the electrolyte upon which the more buoyant electrolyte floats.

The reference electrolyte is the stationary volume of aqueous electrolyte solution 9 participating in the reduction reactions.

The reference cations are the dissociated cations C1 within the reference electrolyte 9.

Reference cations used in experimental gravoltaic cells of the present invention may be any positively charged atom or group of atoms.

The reference anions are the dissociated anions A1 within the reference electrolyte 9.

Reference anions used is experimental gravoltaic cells of the present invention may be any negatively charged atom or group of atoms.

The reactant electrolyte is the stationary volume of electrolyte 29 participating in the oxidation reactions.

The reactant cations are the dissociated cations C2 within the reactant electrolyte 29.

Reactant cations used in experimental gravoltaic cells of the present invention may be any positively charged atom or group of atoms.

The 'reactant anions' are the dissociated anions A2 within the reactant electrolyte 29.

Reactant anions used in experimental gravoltaic cells of the present invention may be any negatively charged atom or group of atoms.

The 'product cations' are atoms from the surface of the anode 25 that have been oxidized and dissolved into the reactant electrolyte 29 as product cations P.

The 'reduction cations' $C1^*$ are those reference cations C1 that are in immediate contact with the surface of the cathode 5 and that are being reduced out of the reference electrolyte as solid atoms S1 and being electroplated onto the surface of the cathode 5.

The atoms S1 are reduction cations $C1^*$ that have been reduced out of the reference electrolyte and have been plated onto the surface of the cathode 5.

The term 'more buoyant product cations' means product cations that are more buoyant than the immediately surrounding reactant electrolyte.

The term 'less buoyant product cations' means product cations that are less buoyant than the immediately surrounding reactant electrolyte.

The term negative buoyancy embodiment of the present invention means the embodiments wherein negative buoyancy forces cause the less buoyant product cations $C1^\wedge$ to sink downward through the stationary volume of more buoyant reactant electrolyte 29 as depicted by the downward pointing dashed arrow 19 (see FIGS. 3 and 5).

The term positive buoyancy embodiment of the present invention means the embodiments wherein positive buoyancy forces cause the more buoyant product cations $C1^\wedge$ to rise upward through the stationary volume of less buoyant reactant electrolyte 29 as depicted by the upward pointing dashed arrow 19 (see FIGS. 4 and 6).

For a more complete understanding of the galvoltaic cells of the present invention, reference is made to the following description and accompanying drawings in which the presently preferred embodiment of the invention is shown by way of example. As the invention may be embodied in many forms without departing from the spirit of essential characteristics thereof, it is expressly understood that the drawings are for purposes of illustration and description only, and are not intended as a definition of the limits of the invention.

BRIEF DESCRIPTION OF THE DRAWINGS

FIG. 21 depicting the first 15 minutes of the disclosed experimental evidence. FIG. 22 depicting the loading effect of an external electrical load resistance. FIG. 23 depicting the difference between the control setup output energy and the experimental setup output energy. FIG. 24 depicting the gravitational energy converted to electrical energy by the experimental setup over that of the control setup.

DETAILED DESCRIPTION OF THE INVENTION

Figure 1:
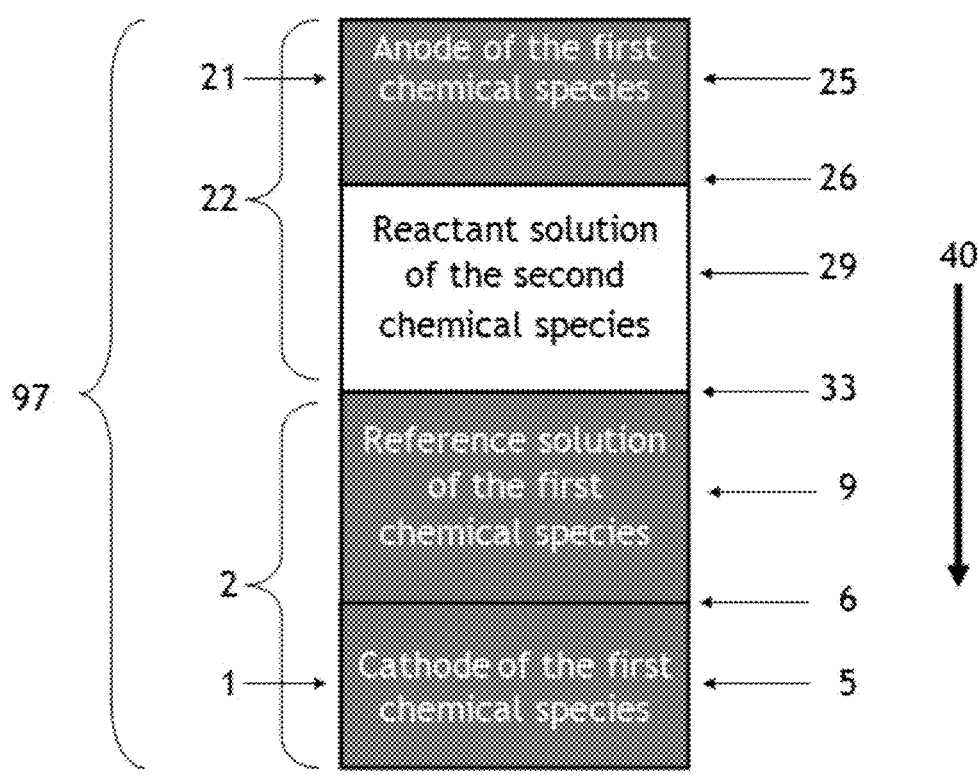
FIG. 1 depicts a block diagram of the seven layers of a negative buoyancy mode of a preferred embodiment of the gravoltaic cell of the present invention.

Electrode Potential:

The electrical potential difference between an electrode and a reference electrode. "Absolute" potential of an electrode cannot be measured; therefore, the electrode potential must always be referred to an "arbitrary zero point," defined by the potential of the reference electrode. Consequently, it is very important always to note the type of reference electrode used in the measurement of the electrode potential. For the Gravoltaic cells of the present invention the cathodes are always the reference electrodes and the anodes are always the measured electrodes.

Equilibrium Electrode Potential:

The electrical potential of an electrode measured against a reference electrode when there is no current flowing through the electrode. In other words, the electromotive force of an electrochemical cell consisting of the electrode in question and a reference electrode. Also called: "open circuit potential (ocp)." See also equilibrium and standard electrode potential. The concept of equilibrium potential is probably easiest to demonstrate with a simple metal/metal-ion electrode system. When a metal (e.g., silver) is immersed in a solution containing its ion (e.g., silver nitrate solution) metal ions will cross the metal/solution interface. They will pass from the phase where the "chemical energy" of the ion is large to the phase where the "chemical energy" of the ion is smaller. Depending on the system, this can occur in either direction. However only the positively charged (e.g., silver) cations can pass through the interface. The negatively charged electrons cannot pass into the solution, and the anions (e.g., nitrate) cannot pass into the metal. Consequently, charge accumulation occurs at the interface forming an electrical double layer. Consider an example when the metal ions move preferentially from the metal into the solution: the metal surface becomes negatively charged because of the accumulation of the electrons left behind, while the solution layer near the metal surface becomes positively charged because of the accumulation of silver ions. This process produces a potential difference between the two phases that will slow and eventually stop the passage of the metal ions. At "equilibrium" the chemical driving force and the opposing electrical force are equal. The potential difference between the metal and the solution phases under these conditions is the "equilibrium potential difference." This potential difference cannot be measured because there is no way to make an electrical connection to the solution phase without setting up another electrode potential. Consequently, electrode potentials are always measured against a reference electrode whose potential is known on an arbitrary scale. See standard hydrogen electrode.

When describing the concentration of a substance it is important to realize that a pure solid or a pure liquid has a concentration of 100 percent. For example, a glass of pure water always has a concentration of 100 percent pure water. A salt could be added to the pure water but then it is no longer pure water. A pure solid metal such as solid copper always has a concentration of 100 percent pure copper. The metal could be dissolved in a solvent but then it is no longer pure metal. If a metal is partially dissolved in a solvent, then the amount of dissolved metal can be described as having a certain molar concentration, but the remaining pure solid metal still has a concentration of 100 percent. When comparing the concentration of the remaining pure metal to the concentration of that metal that has been dissolved into a solvent, units of molar concentration do not easily apply. In this case, units of percent may be more applicable, such as comparing 100 percent pure solid metal to 10 percent dissolved metal within a solvent.

Anode/electrolyte junction, in a galvanic cell, an anode/electrolyte junction is formed at the interface between the cell's anode and the cell's electrolyte in immediate contact with said anode wherein the anode/electrolyte junction is comprised of an anode side of the anode/electrolyte junction in immediate contact with an electrolyte side of the anode/electrolyte junction.

A first example of an anode/electrolyte junction is a galvanic cell having a solid copper anode immersed in a copper chloride electrolyte, wherein the concentration of copper within the solid copper anode side of the anode/electrolyte junction is 100 percent, say by weight, and wherein the concentration of copper within the copper chloride solution side of the anode/electrolyte junction is 10 percent copper solute by weight. In this example, a concentration gradient exists across the anode/electrolyte junction of 100 percent solid copper by weight in the anode side of the anode/electrolyte junction to 10 percent copper by weight in the copper chloride solution side of the anode/electrolyte junction.

A second example of an anode/electrolyte junction is a galvanic cell having a solid copper anode immersed in a calcium chloride electrolyte, wherein the concentration of copper within the solid copper anode side of the anode/electrolyte junction is 100 percent by weight, and wherein the concentration of copper within the calcium chloride electrolyte side of the anode/electrolyte junction is 0 percent by weight. In this example the concentration gradient across the anode/electrolyte junction is 100 percent solid copper by weight in the anode side of the anode/electrolyte junction and 0 percent copper by weight in the calcium chloride solution side of the anode/electrolyte junction.

The amount of the concentration gradient across the anode/electrolyte junction of the first example is less than the amount of concentration gradient across the anode/electrolyte junction of the second example. According to the Nernst equation, the larger amount of the concentration gradient across the anode/electrolyte junction of the second example yields a larger electrode (anode) potential and a larger voltage across the cell's anode and cathode and, the lesser amount of the concentration gradient across the anode/electrolyte junction of the first example yields a lesser electrode (anode) potential and a lesser voltage across the cell's anode and cathode.

For the second example, in real world galvanic operation, since solid copper on the surface of the anode will be oxidizing and dissolving onto the calcium chloride solution, there will be some amount of dissolved copper product cations (cations that are the product of oxidation reactions at the anode) within the calcium chloride solution as a result of the oxidation reactions. However, the gravoltaic cells of the present invention are configured to utilize gravity by way of positive and negative buoyancy forces to remove the dissolved copper away from the immediate vicinity of the anode/electrolyte junction thus maintaining a greater amount of the concentration gradient across the anode/electrolyte junction than for other galvanic cells not so configured.

For both of the above examples of an anode/electrolyte junction, the force of the concentration gradient across the junction provides the driving force necessary to drive the spontaneous oxidation of atoms on the surface of the anode into product cations as the two sides of the anode/electrolyte junction attempt to equalize the two different concentrations of copper across the concentration gradient across the anode/electrolyte junction. Because of the larger amount of the concentration gradient across the anode/electrolyte junction of the second example, the second example will have a larger concentration gradient driving force and a larger electrode (anode) potential and a larger cell output voltage than the above first example.

For the above first example, the interface at the junction between the solid copper anode and the copper chloride solution forms a passive similar chemical species anode/electrolyte junction that produces a characteristically low electrode (anode) potential resulting in a low cell output voltage. For the above second example, the interface at the junction between the solid copper anode and the calcium chloride solution forms an active dissimilar chemical species anode/electrolyte junction that produces a characteristically high electrode (anode) potential resulting in a high cell output voltage.

Electrolyte Stratification:

A typical lead-acid battery contains a mixture with varying concentrations of water and acid. Sulfuric acid has a higher density than water, which causes the acid formed at the plates during charging to flow downward and collect at the bottom of the battery. Eventually the mixture will again reach uniform composition by diffusion, but this is a very slow process. In this instance, the force of buoyancy-induced stratification dominates over the force of diffusion-induced equalization. The gravoltaic cell of the present invention utilizes buoyancy-induced stratification that also dominates over the force of diffusion.

Buoyancy is the ability or tendency of an object to float in water or air or some other fluid, therefore the process of buoyancy assumes two separate components, a more buoyant object to float and a less buoyant fluid to float on.

There are two separate elements of the electrolyte stratification described above, first a dynamic downward flow of the less buoyant sulfuric acid, and second a static collection of a volume of sulfuric acid at the bottom of the battery and a static collection of a volume of the more buoyant component (water) is floating on top of the static collection of less buoyant component (sulfuric acid). For gravoltaic cells of the present invention, there are two separate elements of electrolyte stratification, first a dynamic flow of product cations away from the vicinity of the anode, and second a static collection of more buoyant electrolyte floating on top of the less buoyant electrolyte.

For negative buoyancy embodiments of the gravoltaic cells of the present invention there is a dynamic downward flow of less buoyant product cations through a volume of reactant electrolyte and a static or stationary volume of the more buoyant reactant electrolyte floating on top of a static or stationary volume of the less buoyant reference electrolyte. For positive buoyancy embodiments of the gravoltaic cells of the present invention there is a dynamic upward flow of more buoyant product cations through a volume of reactant electrolyte and a static or stationary volume of the more buoyant reference electrolyte floating on top of a static or stationary volume of the less buoyant reactant electrolyte. For both the negative buoyancy embodiments of the gravoltaic cells of the present invention and the positive buoyancy embodiments of the gravoltaic cells of the present invention the stationary volume of reference electrolyte and the stationary volume of reactant electrolyte are vertically stratified into two separate stationary layers and are held separate and stratified and stationary by buoyancy forces wherein the more buoyant electrolyte floats on top of the less buoyant electrolyte.

Figure 2:
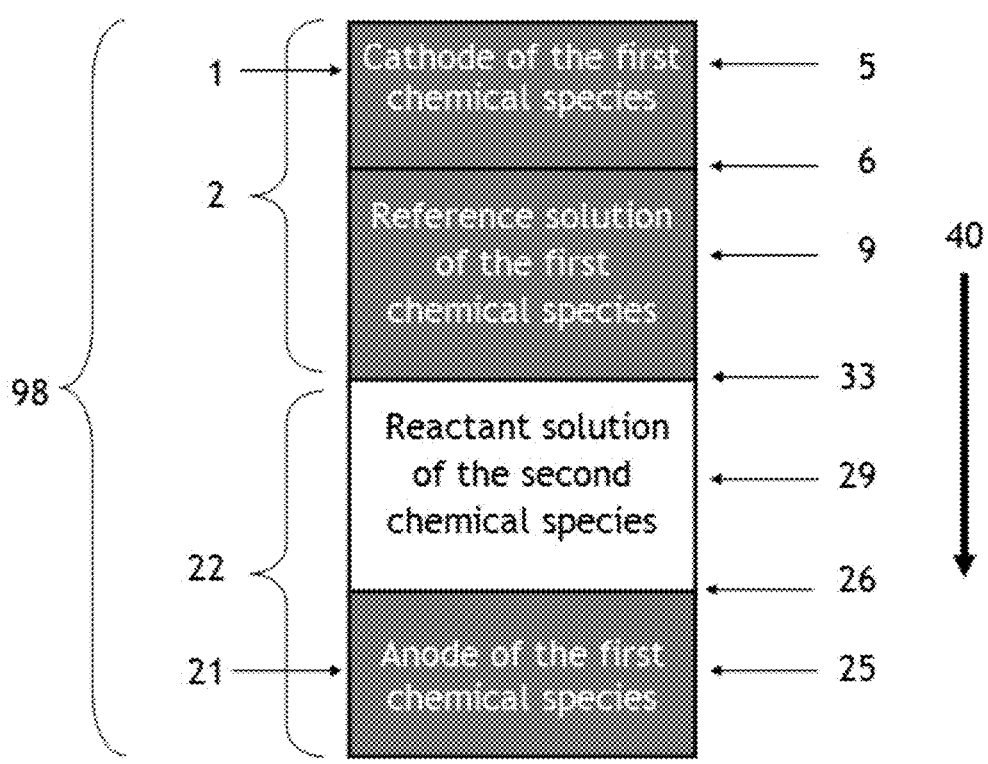
FIG. 2 depicts a block diagram of the seven layers of a positive buoyancy mode of a preferred embodiment of the gravoltaic cell of the present invention.

The preferred embodiments of the present invention utilize two separate and stationary volumes of electrolyte solutions; referring now to FIGS. 1 and 2 a stationary volume of reactant electrolyte 29 is in contact with the anode 25 at junction 26 and a stationary volume of reference electrolyte 9 in contact with the cathode 5 at junction 6 wherein said stationary volume of reactant electrolyte and said stationary volume of reference electrolyte are in contact with each other at interface 33. Stationary volume of reactant electrolyte 29 and stationary volume of reference electrolyte 9 are comprised of different cation chemical species, for example in FIG. 1 the anode and cathode may be comprised of solid copper and the stationary volume of reactant electrolyte 29 may be comprised of calcium cations of a calcium chloride solution and the stationary volume of reference electrolyte 9 may be comprised of copper cations of a copper chloride solution, wherein the stationary volume of calcium chloride at 110.98 g/mol molecular weight reactant electrolyte 29 is more buoyant than the stationary volume of copper chloride at 134.45 g/mol molecular weight reference electrolyte 9, wherein the stationary volume of calcium chloride reactant electrolyte 29 floats on top of the stationary volume of copper chloride reference electrolyte 9, and in FIG. 2 the anode and cathode may be comprised of solid aluminum and the stationary volume of reactant electrolyte 29 may be comprised of copper chloride and stationary volume of reference electrolyte 9 may be comprised of aluminum chloride at 133.34 g/mol molecular weight, wherein the stationary volume of aluminum chloride reference electrolyte 9 is more buoyant than the stationary volume of copper chloride at 134.45 g/mol molecular weight reactant electrolyte 29, wherein the stationary volume of aluminum chloride reference electrolyte 9 floats on top of the stationary volume of copper chloride reactant electrolyte 29, wherein for both FIG. 1 and FIG. 2 the two separate and stationary volumes of electrolytes are vertically stratified relative to each other with the more buoyant stationary volume of electrolyte floating or stratified on top of the less buoyant stationary volume of electrolyte.

FIG. 1 depicts a block diagram of the seven layers of the negative buoyancy mode preferred embodiment of the gravoltaic cell 97 of the present invention comprised of the first placement 1, the first compartment 2, cathode layer 5 having solid atoms of the first chemical species in contact with the less buoyant stationary volume of aqueous reference electrolyte layer 9 having cations of the first chemical species, cathode/electrolyte junction layer 6 located between the cathode layer 5 and reference electrolyte layer 9, electrolyte to electrolyte interface layer 33 located between less buoyant aqueous reference electrolyte layer 9 and more buoyant aqueous reactant electrolyte layer 29, more buoyant stationary volume of aqueous reactant electrolyte layer 29 having cations of the second chemical species, anode layer 25 having solid atoms of the first chemical species, anode/electrolyte junction layer 26 located between the anode layer 25 and reactant electrolyte layer 29, a second placement 21, a second compartment 22, wherein said cathode and said anode are comprised of solid atoms of the first chemical species and wherein said aqueous reference electrolyte having cations of the first chemical species and wherein the aqueous reactant electrolyte having cations of the second chemical species. The layers having the first chemical species are shaded in gray with white lettering and the layer having the second chemical species is shaded in white with black lettering, and the direction of the force of earth's gravity 40.

FIG. 2 depicts a block diagram of the seven layers of the positive buoyancy mode preferred embodiment of the gravoltaic cell 98 of the present invention comprised of, a first placement 1, a first compartment 2, more buoyant stationary volume of aqueous reference electrolyte layer 9 having cations of the first chemical species in contact with cathode layer 5 having solid atoms of the first chemical species, cathode/electrolyte junction layer 6 located between the cathode layer 5 and reference electrolyte layer 9, anode layer 25 having solid atoms of the first chemical species, less buoyant stationary volume of aqueous reactant electrolyte layer 29 having cations of the second chemical species, anode/electrolyte junction layer 26 located between the anode layer 25 and reactant electrolyte layer 29, electrolyte to electrolyte interface layer 33 located between more buoyant aqueous reference electrolyte layer 9 and less buoyant aqueous reactant electrolyte layer 29, second placement 21, second compartment 22, wherein said cathode and said anode are comprised of solid atoms of the first chemical species and wherein said aqueous reference electrolyte having cations of the first chemical species and wherein the aqueous reactant electrolyte having cations of the second chemical species. The layers having the first chemical species are shaded in gray with white lettering and the layer having the second chemical species are shaded in white with black lettering, the direction of the force of earth's gravity 40.

Figure 3:
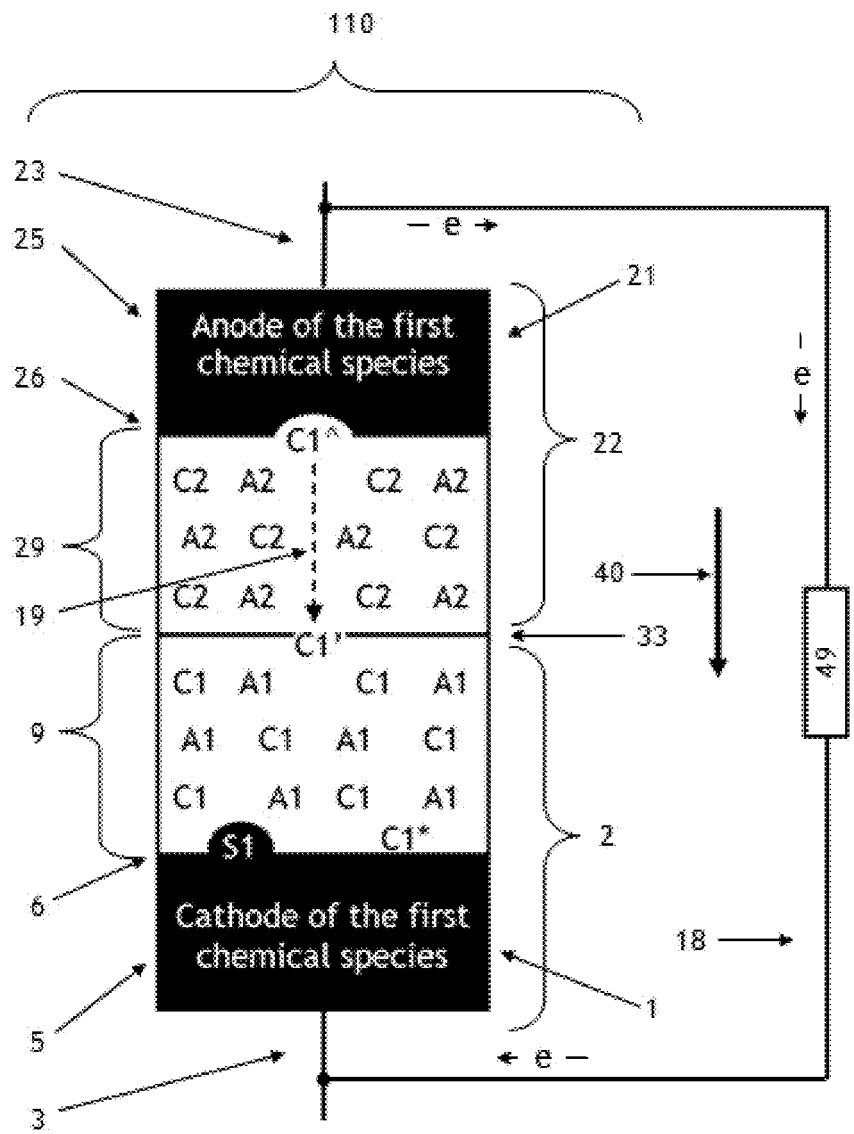
FIG. 3 depicts a block representation of a negative buoyancy embodiment of the present invention with an external load resistance and an external load resistance circuit.

FIG. 3 depicts a block representation of a negative buoyancy embodiment of the present invention 110 comprising;

first placement 1, first compartment 2, cathode 5 of the first chemical species having a first placement 1, cathode output terminal 3, cathode/electrolyte junction 6 between cathode 5 and stationary volume of less buoyant reference electrolyte 9, stationary volume of less buoyant aqueous reference electrolyte 9 homogeneously disposed within the first compartment 2 above and in contact with cathode 5 comprised of a sub-volume of solvent (for example water) represented by the white space within the stationary volume of less buoyant reference electrolyte 9, a sub-volume of solute represented by C1 and A1 disposed within the stationary volume of less buoyant reference electrolyte 9, wherein C1 are solute cations of the first chemical species and wherein A1 are solute anions of the less buoyant aqueous reference electrolyte 9, less buoyant reference cations C1* in immediate contact with cathode 5 being reduced out of solution as solid atoms S1, second placement 21, second compartment 22, anode 25 of the first chemical species having a second placement 21, anode output terminal 23, Anode/electrolyte junction 26 between anode 25 and stationary volume of more buoyant reactant electrolyte 29, stationary volume of more buoyant aqueous reactant electrolyte 29 homogeneously disposed within the second compartment 22 below and in contact with anode 25 comprised of a sub-volume of solvent (for example water) represented by the white space within the stationary volume of more buoyant reactant electrolyte 29, a sub-volume of solute represented by C2 and A2 disposed within the stationary volume of more buoyant reactant electrolyte 29, wherein C2 are solute cations of the second chemical species and wherein A2 are solute anions of the more buoyant reactant electrolyte 29, solid atoms on the surface of anode 25 spontaneously oxidize and dissolve into the stationary volume of the more buoyant aqueous reactant electrolyte 29 as less buoyant product cation C1ˆ, wherein said product cation C1ˆ are the product of spontaneous oxidation reactions at the surface of anode 25, wherein said product cation C1ˆ being less buoyant than the surrounding more buoyant aqueous reactant electrolyte 29 sink downward through the stationary volume of the more buoyant aqueous reactant electrolyte 29 toward the stationary volume of less buoyant aqueous reference electrolyte 9 as depicted by the downward pointing dashed arrow 19 indicating the direction of sinking, interface 33 between the stationary volume of more buoyant reactant electrolyte 29 and the stationary volume of less buoyant reference electrolyte 9 wherein the stationary volume of more buoyant aqueous reactant electrolyte 29 and the stationary volume of less buoyant aqueous reference electrolyte 9 are in contact with each other at interface 33, and wherein the stationary volume of more buoyant aqueous reactant electrolyte 29 floats on top of the stationary volume of less buoyant aqueous reference electrolyte 9, external load resistance circuit 18, external load resistance 49, direction of electron flow e, direction of earth's gravitational field 40, and interface 33 between more buoyant aqueous reactant electrolyte 29 and of less buoyant aqueous reference electrolyte 9.

Solid anode 25 atoms of the first chemical species (for example solid copper atoms) represented the black shaded area within the anode on the surface of anode 25 are in immediate contact with more buoyant aqueous reactant electrolyte 29 (for example aqueous calcium chloride) of the second chemical species forming an active dissimilar chemical species anode/electrolyte junction 26, wherein the concentration of the first chemical species (for example solid copper atoms) within the solid anode 25 is 100 percent by weight, and wherein the concentration of the first chemical species (for example copper cations) within the more buoyant aqueous reactant electrolyte 29 of the second chemical species (for example calcium chloride) is 0 percent by weight, forming a concentration gradient of the first chemical species across the anode/electrolyte junction 26, for example 100 percent copper on the anode 25 side of the anode/electrolyte junction 26 and 0 percent copper on the reactant 29 side of the anode/electrolyte junction 26.

The force of the concentration gradient across anode/electrolyte junction 26 provides the driving force necessary to drive the spontaneous oxidation of atoms on the surface of the anode 25 into product cations C1^ as the two sides of the anode/electrolyte junction 26 attempt to equalize the two different concentrations of the first chemical species across the concentration gradient across the anode/electrolyte junction 26. Solid anode atoms of the first chemical species on the surface of the anode 25 spontaneously oxidize into aqueous product cations C1^ of the first chemical species and dissolve into the aqueous reactant electrolyte 29 of the second chemical species, thus reducing the concentration gradient across anode/electrolyte junction 26, wherein the anode 25 side of the anode/electrolyte junction 26 has 100 percent concentration of the first chemical species and the aqueous reactant electrolyte 29 side of the anode/electrolyte junction 26 has more than 0 percent concentration of the first chemical species in immediate contact with the anode 25.

The electrons e produced by the spontaneous oxidation reaction exit the cell through the anode output terminal 23 and travel through external load resistance circuit 18, through external load resistance 49 and reenter the cell through the cathode output terminal 3 where said electrons on the surface of cathode 5 combine with aqueous reference cations C1* to spontaneously reduce reference cations C1* out of solution as solid atoms S1 of the first chemical species, wherein solid atoms S1 are plated out onto the surface of cathode 5.

Less buoyant oxidized aqueous product cations C1^ (for example copper product cations each cation having an atomic weight of 63.546) sink in the direction of earth's gravity 40 as depicted by the downward pointing dashed arrow 19 through the stationary volume of more buoyant aqueous reactant electrolyte 29 (for example having calcium cations having an atomic weight of 40.078) until said less buoyant oxidized aqueous product cations C1^ reach interface 33 and enter the stationary volume of less buoyant aqueous reference electrolyte 9 (for example having copper cations having an atomic weight of 63.546), wherein aqueous product cations C1^ attain neutral buoyancy within the stationary volume of less buoyant aqueous reference electrolyte 9 where the sinking of aqueous product cations C1^ stops at interface 33.

Said oxidized aqueous product cations C1^ become aqueous reference cations C1' and become part of the stationary volume of less buoyant aqueous reference electrolyte 9, wherein the aqueous product cations C1' resupply the stationary volume of less buoyant aqueous reference electrolyte 9 with new aqueous cations C1 of the first chemical species that were lost to the solid cathode 5 due to the reduction and plating out of solution of cations C1* of the first chemical species onto the surface of cathode 5 of the first chemical species.

Aqueous reference cations C1* of the first chemical species in immediate contact with the surface of cathode 5 reduce out of solution as solid atoms of the first chemical species S1 and electroplate out onto the working surface of cathode 5.

The action of gravity entering the cell and by way of negative buoyancy force sinking the less buoyant oxidized aqueous product cations C1^ away from the immediate vicinity of the anode 25 increases the concentration gradient across anode/electrolyte junction 26.

SUMMARY the anode/electrolyte junction 26 wants to equalize the two different concentrations of the first chemical species across the concentration gradient across the anode/electrolyte junction 26 strongly enough that it will give the electrons sufficient push (the cell potential) that they may be used to do electrical work.

Figure 4:
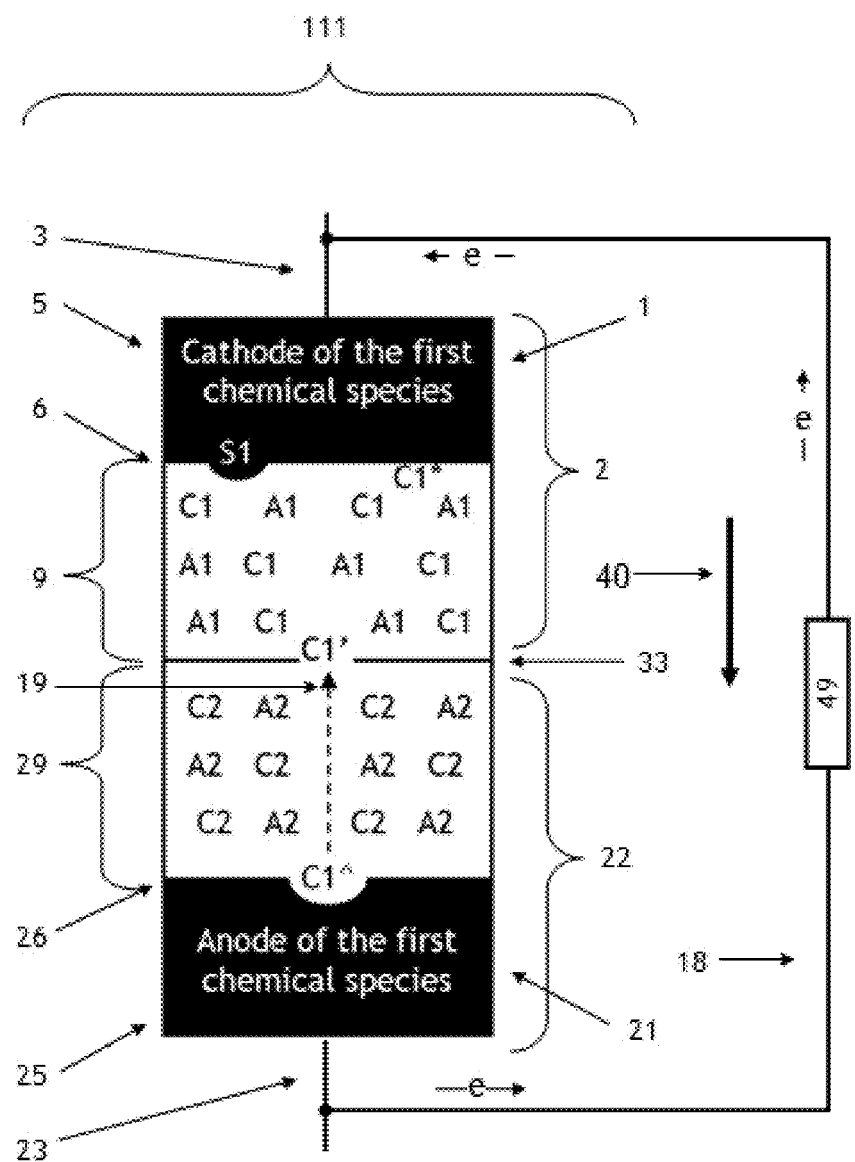
FIG. 4 depicting a block representation of a positive buoyancy embodiment of the present invention and an external load resistance and an external load resistance circuit.

FIG. 4 depicts a block representation of a positive buoyancy embodiment of the present invention 111 comprising; first placement 1, first compartment 2, cathode 5 of the first chemical species having a first placement 1, cathode output terminal 3, cathode/electrolyte junction 6 between cathode 5 and stationary volume of less buoyant reference electrolyte 9, stationary volume of more buoyant aqueous reference electrolyte 9 homogeneously disposed within the first compartment 2 above and in contact with cathode 5 comprised of a sub-volume of solvent (for example water) represented by the white space within the stationary volume of more buoyant reference electrolyte 9, a sub-volume of solute represented by C1 and A1 disposed within the stationary volume of more buoyant aqueous reference electrolyte 9, wherein C1 are solute cations of the first chemical species and wherein A1 are solute anions of the more buoyant aqueous reference electrolyte 9, less buoyant reference cations C1* in immediate contact with cathode 5 being reduced out of solution as solid atoms S1, second placement 21, second compartment 22, anode 25 of the first chemical species having a second placement 21, anode output terminal 23, Anode/electrolyte junction 26 between anode 25 and stationary volume of more buoyant reactant electrolyte 29, stationary volume of less buoyant aqueous reactant electrolyte 29 homogeneously disposed within the second compartment 22 below and in contact with anode 25 comprised of a sub-volume of solvent (for example water) represented by the white space within the stationary volume of less buoyant reactant electrolyte 29, a sub-volume of solute represented by C2 and A2 disposed within the stationary volume of less buoyant reactant electrolyte 29, wherein C2 are solute cations of the second chemical species and wherein A2 are solute anions of the less buoyant reactant electrolyte 29, solid atoms on the surface of anode 25 spontaneously oxidize and dissolve into the stationary volume of the less buoyant aqueous reactant electrolyte 29 as more buoyant product cation C1^, wherein said product cation C1^ are the product of spontaneous oxidation reactions at the surface of anode 25, wherein said product cation C1^ being more buoyant than the surrounding less buoyant aqueous reactant electrolyte 29 rise upward through the stationary volume of the less buoyant aqueous reactant electrolyte 29 toward the stationary volume of more buoyant aqueous reference electrolyte 9 as depicted by the upward pointing dashed arrow 19 indicating the direction of rising, Interface 33 between the stationary volume of less buoyant reactant electrolyte 29 and the stationary volume of more buoyant reference electrolyte 9, wherein the stationary volume of less buoyant aqueous reactant electrolyte 29 and the stationary volume of more buoyant aqueous reference electrolyte 9 are in contact with each other at interface 33, and wherein the stationary volume of more buoyant aqueous reference electrolyte 9 floats on top of the stationary volume of less buoyant aqueous reactant electrolyte 29, external load resistance circuit 18, external load resistance 49, direction of electron flow e, direction of earth's gravitational field 40, and interface 33 between less buoyant aqueous reactant electrolyte 29 and of more buoyant aqueous reference electrolyte 9.

Solid anode atoms of the first chemical species (for example solid aluminum atoms) represented the black shaded area within the anode on the surface of anode 25 are in immediate contact with less buoyant aqueous reactant electrolyte 29 (for example aqueous copper chloride) of the second chemical species forming an active dissimilar chemical species anode/electrolyte junction 26, wherein the concentration of the first chemical species (for example solid aluminum atoms) within the solid anode 25 is 100 percent by weight, and wherein the concentration of the first chemical species (for example aluminum cations) within the less buoyant aqueous reactant electrolyte 29 of the second chemical species (for example copper chloride) is 0 percent by weight, forming a concentration gradient of the first chemical species across the anode/electrolyte junction 26, for example 100 percent aluminum on the anode 25 side of the anode/electrolyte junction 26 and 0 percent aluminum on the reactant 29 side of the anode/electrolyte junction 26.

The force of the concentration gradient across anode/electrolyte junction 26 provides the driving force necessary to drive the spontaneous oxidation of atoms on the surface of the anode 25 into product cations $C1^{\wedge}$ as the two sides of the anode/electrolyte junction 26 attempt to equalize the two different concentrations of the first chemical species across the concentration gradient across the anode/electrolyte junction 26.

Solid anode atoms of the first chemical species on the surface of the anode 25 spontaneously oxidize into aqueous product cations $C1^{\wedge}$ of the first chemical species and dissolve into the aqueous reactant electrolyte 29 of the second chemical species, thus reducing the concentration gradient across anode/electrolyte junction 26, wherein the anode 25 side of the anode/electrolyte junction 26 has 100 percent concentration of the first chemical species and the aqueous reactant electrolyte 29 side of the anode/electrolyte junction 26 has more than 0 percent concentration of the first chemical species in immediate contact with the anode 25.

The electrons e produced by the spontaneous oxidation reaction exit the cell through the anode output terminal 23 and travel through external load resistance circuit 18, through external load resistance 49 and reenter the cell through the cathode output terminal 3 where said electrons on the surface of cathode 5 combine with aqueous reference cations C1* to spontaneously reduce reference cations C1* out of solution as solid atoms S1 of the first chemical species, wherein solid atoms S1 are plated out onto the surface of cathode 5.

More buoyant oxidized aqueous product cations $C1^{\wedge}$ (for example aluminum product cations each cation having an atomic weight of 26.981539) rise opposite to the direction of earth's gravity 40 as depicted by the upward pointing dashed arrow 19 through the stationary volume of more buoyant aqueous reactant electrolyte 29 (for example having copper cations having an atomic weight of 63.546) until said more buoyant oxidized aqueous product cations $C1^{\wedge}$ reach interface 33 and enter the stationary volume of more buoyant aqueous reference electrolyte 9 (for example having aluminum cations having an atomic weight of 26.981539), wherein aqueous product cations $C1^{\wedge}$ attain neutral buoyancy within the stationary volume of more buoyant aqueous reference electrolyte 9 where the rising of aqueous product cations $C1^{\wedge}$ stops at interface 33.

Said oxidized aqueous product cations $C1^{\wedge}$ become aqueous reference cations C1' and become part of the stationary volume of more buoyant aqueous reference electrolyte 9, wherein the aqueous product cations C1' resupply the stationary volume of more buoyant aqueous reference electrolyte 9 with new aqueous cations C1 of the first chemical species that were lost to the solid cathode 5 due to the reduction and plating out of solution of cations C1* of the first chemical species onto the surface of cathode 5 of the first chemical species.

Aqueous reference cations C1* of the first chemical species in immediate contact with the surface of cathode 5 reduce out of solution as solid atoms of the first chemical species S1 and plate out onto the working surface of cathode 5.

The action of gravity entering the cell and by way of positive buoyancy force rising the more buoyant oxidized aqueous product cations $C1^{\wedge}$ away from the immediate vicinity of the anode 25 increases the concentration gradient across anode/electrolyte junction 26.

SUMMARY the anode/electrolyte junction 26 wants to equalize the two different concentrations of the first chemical species across the concentration gradient across the anode/electrolyte junction 26 strongly enough that it will give the electrons sufficient push (the cell potential) that they may be used to do electrical work.

Figure 5:
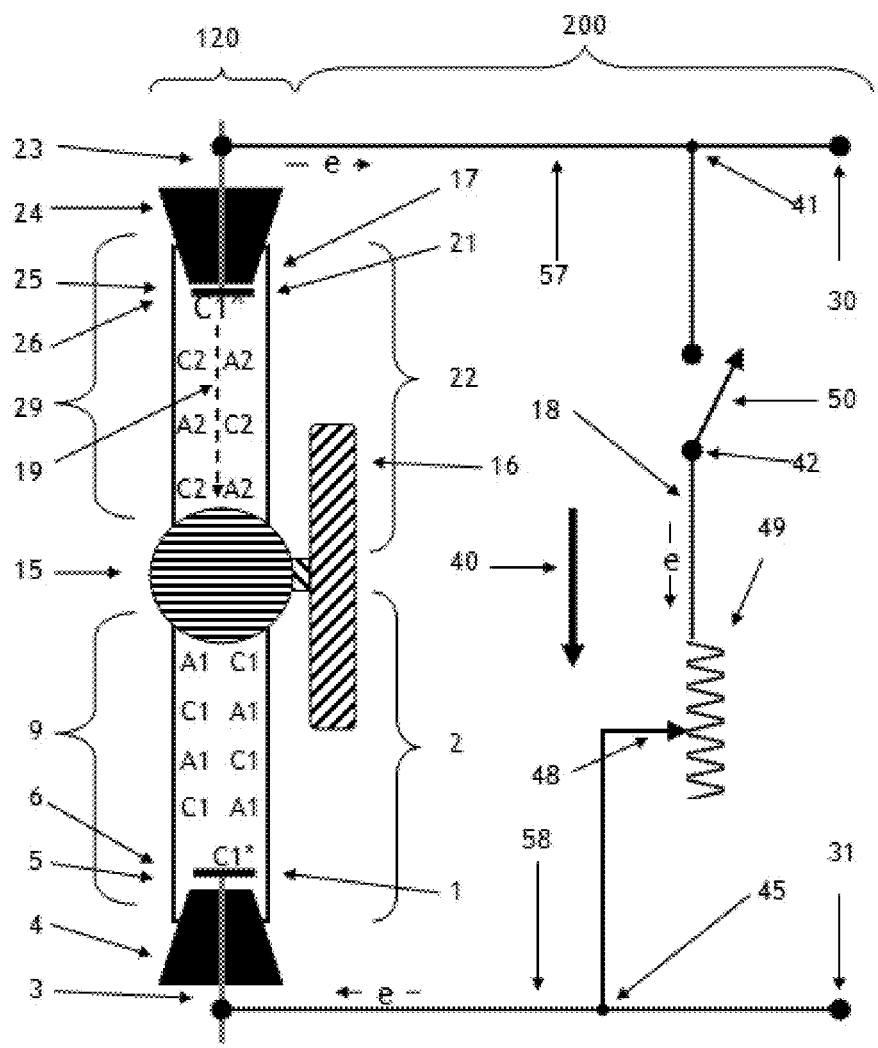
FIG. 5 depicts a preferred embodiment of a negative buoyancy mode of the present invention connected to an external load circuit, with a ball valve handle shown in the valve open position.

FIG. 5 depicts a preferred embodiment of a negative buoyancy mode of the present invention 120 comprising; first placement 1, first compartment 2, cathode 5 of the first chemical species having a first placement 1, cathode output terminal 3, cathode/electrolyte junction 6 between cathode 5 and stationary volume of less buoyant reference electrolyte 9, stationary volume of less buoyant aqueous reference electrolyte 9 homogeneously disposed within the first compartment 2 above and in contact with cathode 5 comprised of a sub-volume of solvent (for example water) represented by the white space within the stationary volume of less buoyant reference electrolyte 9, a sub-volume of solute represented by C1 and A disposed within the stationary volume of less buoyant reference electrolyte 9, wherein C1 are solute cations of the first chemical species and wherein A are solute anions of the less buoyant aqueous reference electrolyte 9, less buoyant reference cations C1* in immediate contact with cathode 5 being reduced out of solution as solid atoms plated out onto the surface of cathode 5, second placement 21, second compartment 22, anode 25 of the first chemical species having a second placement 21, anode output terminal 23, Anode/electrolyte junction 26 between anode 25 and stationary volume of more buoyant reactant electrolyte 29, stationary volume of more buoyant aqueous reactant electrolyte 29 homogeneously disposed within the second compartment 22 below and in contact with anode 25 comprised of a sub-volume of solvent (for example water) represented by the white space within the stationary volume of more buoyant reactant electrolyte 29, a sub-volume of solute represented by C2 and A disposed within the stationary volume of more buoyant reactant electrolyte 29, wherein C2 are solute cations of the second chemical species and wherein A are solute anions of the more buoyant reactant electrolyte 29, solid atoms on the surface of anode 25 spontaneously oxidize and dissolve into the stationary volume of the more buoyant aqueous reactant electrolyte 29 as less buoyant product cation $C1^{\wedge}$, wherein said product cation $C1^{\wedge}$ are the product of spontaneous oxidation reactions at the surface of anode 25, wherein said product cation $C1^{\wedge}$ being less buoyant than the surrounding more buoyant aqueous reactant electrolyte 29 sink downward through the stationary volume of the more buoyant aqueous reactant electrolyte 29 toward the stationary volume of less buoyant aqueous reference electrolyte 9 as depicted by the downward pointing dashed arrow 19 indicating the direction of sinking, wherein the stationary volume of more buoyant aqueous reactant electrolyte 29 floats on top of the stationary volume of less buoyant aqueous reference electrolyte 9, external load circuit 200 comprised of test leads 57 and 58, output terminals 30 and 31, variable load resistance circuit 18 comprised of single pole single through load switch 50 connected to test lead 57 at point 41 and connected to variable load resistor 49 at point 42, variable load resistor 49 with variable load resistor tap 48 connected to test lead 58 at point 45, direction of electron flow e, direction of earth's gravitational field 40. A ball valve handle 16 is shown in the valve open position.

Solid anode atoms of the first chemical species (for example solid copper atoms) on the surface of anode 25 are in immediate contact with more buoyant aqueous reactant electrolyte 29 (for example aqueous calcium chloride) of the second chemical species forming an active dissimilar chemical species anode/electrolyte junction 26, wherein the concentration of the first chemical species (for example solid copper atoms) within the solid anode 25 is 100 percent by weight, and wherein the concentration of the first chemical species (for example copper cations) within the more buoyant aqueous reactant electrolyte 29 of the second chemical species (for example calcium chloride) is 0 percent by weight, forming a concentration gradient of the first chemical species across the anode/electrolyte junction 26, for example 100 percent copper on the anode 25 side of the anode/electrolyte junction 26 and 0 percent copper on the reactant 29 side of the anode/electrolyte junction 26.

The force of the concentration gradient across anode/electrolyte junction 26 provides the driving force necessary to drive the spontaneous oxidation of atoms on the surface of the anode 25 into product cations C1^ as the two sides of the anode/electrolyte junction 26 attempt to equalize the two different concentrations of the first chemical species across the concentration gradient across the anode/electrolyte junction 26.

Solid anode atoms of the first chemical species on the surface of the anode 25 spontaneously oxidize into aqueous product cations C1^ of the first chemical species and dissolve into the aqueous reactant electrolyte 29 of the second chemical species, thus reducing the concentration gradient across anode/electrolyte junction 26, wherein the anode 25 side of the anode/electrolyte junction 26 has 100 percent concentration of the first chemical species and the aqueous reactant electrolyte 29 side of the anode/electrolyte junction 26 has more than 0 percent concentration of the first chemical species in immediate contact with the anode 25.

The electrons e produced by the spontaneous oxidation reaction exit the cell through the anode output terminal 23 and travel through external load circuit 200, through external load resistance 49 and reenter the cell through the cathode output terminal 3 where said electrons on the surface of cathode 5 combine with aqueous reference cations C1* to spontaneously reduce reference cations C1* out of solution as solid atoms plated out onto the surface of cathode 5.

Less buoyant oxidized aqueous product cations C1^ (for example copper product cations each cation having an atomic weight of 63.546) sink in the direction of earth's gravity 40 as depicted by the downward pointing dashed arrow 19 through the stationary volume of more buoyant aqueous reactant electrolyte 29 (for example having calcium cations having an atomic weight of 40.078) until said less buoyant oxidized aqueous product cations C1^ enter the stationary volume of less buoyant aqueous reference electrolyte 9 (for example having copper cations having an atomic weight of 63.546), wherein aqueous product cations C1^ attain neutral buoyancy within the stationary volume of less buoyant aqueous reference electrolyte 9 where the sinking of aqueous product cations C1^ stops, wherein said oxidized aqueous product cations C1^ become aqueous reference cations C1 and become part of the stationary volume of less buoyant aqueous reference electrolyte 9, wherein the aqueous product cations C1^ resupply the stationary volume of less buoyant aqueous reference electrolyte 9 with new aqueous cations C1 of the first chemical species that were lost to the solid cathode 5 due to the reduction and plating out of solution of cations C1* of the first chemical species onto the surface of cathode 5 of the first chemical species.

Aqueous reference cations C1* of the first chemical species in immediate contact with the surface of cathode 5 reduce out of solution as solid atoms of the first chemical species and plate out onto the surface of cathode 5.

The action of gravity entering the cell and by way of negative buoyancy force sinking the less buoyant oxidized aqueous product cations C1^ away from the immediate vicinity of the anode 25 increases the concentration gradient across anode/electrolyte junction 26.

SUMMARY the anode/electrolyte junction 26 wants to equalize the two different concentrations of the first chemical species across the concentration gradient across the anode/electrolyte junction 26 strongly enough that it will give the electrons sufficient push (the cell potential) that they may be used to do electrical work.

When the single pole single throw load switch 50 is placed in the open position as shown, the external variable load resistance 18 is not connected to gravoltaic cell 120 and variable load resistance 49 does not appear across gravoltaic cell 120 electrode terminals 3 and 23.

When the single pole single throw load switch 50 is placed in the open position as shown, gravoltaic cell 120 open circuit cell voltage appears across external load circuit 200 output terminals 30 and 31. When the single pole single throw load switch 50 is placed in the closed position (not shown in FIG. 5), the electrons e produced by the spontaneous oxidation reactions at anode 25 exit the cell through the anode output terminal 23 and travel through external variable load resistance 18, through single pole single throw load switch 50, through variable load resistance 49 and reenter the cell through the cathode output terminal 3. When the single pole single throw load switch 50 is placed in the closed position (not shown in FIG. 5), gravoltaic cell 120 closed circuit cell voltage appears across external load circuit 200 output terminals 30 and 31. When the single pole single throw load switch 50 is placed in the closed position (not shown in FIG. 5), the value of load resistance ohms placed across gravoltaic cell 120 output terminals 3 and 23 may be varied by adjusting variable load resistance 49 tap 48 to the desired value.

Figure 6:
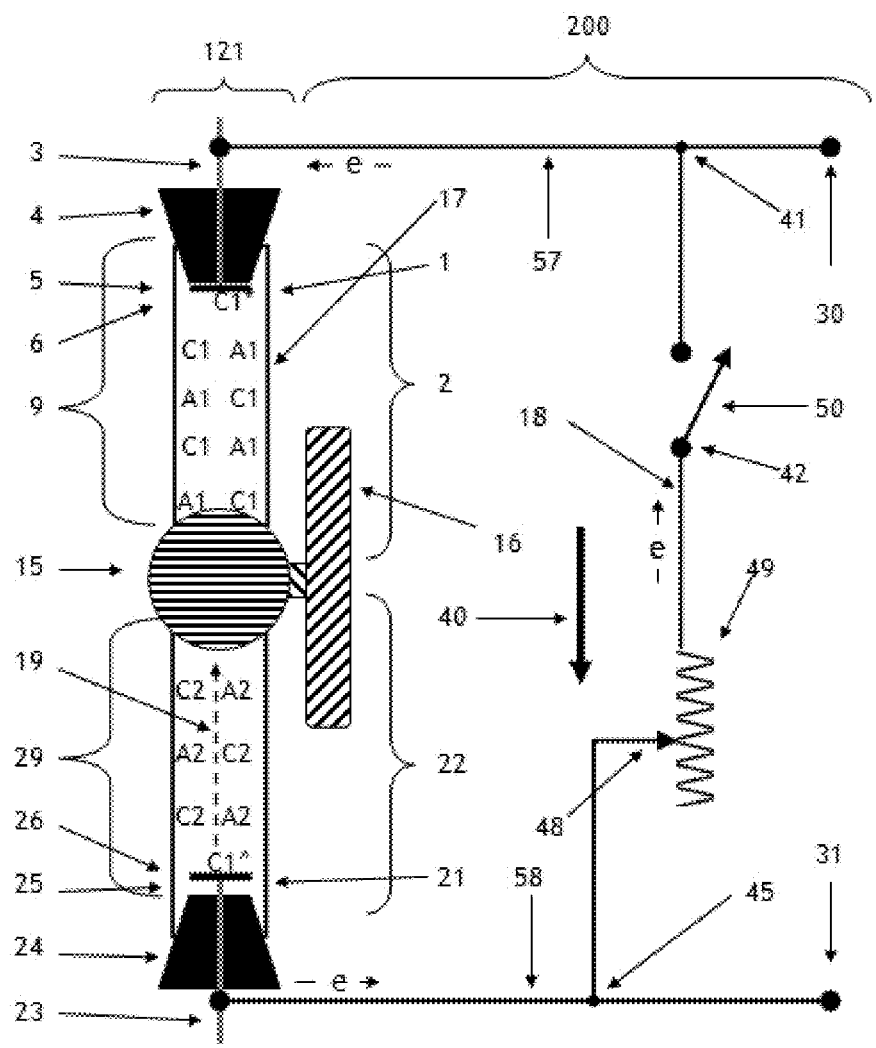
FIG. 6 depicts a preferred embodiment of a positive buoyancy mode of the present invention connected to an external load circuit, with the ball valve handle shown in the valve open position.

FIG. 6 depicts a negative buoyancy mode preferred embodiment of the present invention 120 comprising; first placement 1, first compartment 2, cathode 5 of the first chemical species having a first placement 1, cathode output terminal 3, cathode/electrolyte junction 6 between cathode 5 and stationary volume of more buoyant reference electrolyte 9, stationary volume of more buoyant aqueous reference electrolyte 9 homogeneously disposed within the first compartment 2 below and in contact with cathode 5 comprised of a sub-volume of solvent (for example water) represented by the white space within the stationary volume of more buoyant reference electrolyte 9, a sub-volume of solute represented by C1 and A disposed within the stationary volume of more buoyant reference electrolyte 9, wherein C1 are solute cations of the first chemical species and wherein A are solute anions of the more buoyant aqueous reference electrolyte 9, more buoyant reference cations C1* in immediate contact with cathode 5 being reduced out of solution as solid atoms plated out onto the surface of cathode 5, second placement 21, second compartment 22, anode 25 of the first chemical species having a second placement 21, anode output terminal 23, Anode/electrolyte junction 26 between anode 25 and stationary volume of less buoyant reactant electrolyte 29, stationary volume of less buoyant aqueous reactant electrolyte 29 homogeneously disposed within the second compartment 22 below and in contact with anode 25 comprised of a sub-volume of solvent (for example water) represented by the white space within the stationary volume of less buoyant reactant electrolyte 29, a sub-volume of solute represented by C2 and A disposed within the stationary volume of less buoyant reactant electrolyte 29, wherein C2 are solute cations of the second chemical species and wherein A are solute anions of the less buoyant reactant electrolyte 29, solid atoms on the surface of anode 25 spontaneously oxidize and dissolve into the stationary volume of the less buoyant aqueous reactant electrolyte 29 as more buoyant product cation C1^, wherein said product cation C1^ are the product of spontaneous oxidation reactions at the surface of anode 25, wherein said product cation C1^ being more buoyant than the surrounding less buoyant aqueous reactant electrolyte 29 rise upward through the stationary volume of the less buoyant aqueous reactant electrolyte 29 toward the stationary volume of more buoyant aqueous reference electrolyte 9 as depicted by the upward pointing dashed arrow 19 indicating the direction of rising, wherein the stationary volume of more buoyant aqueous reference electrolyte 9 floats on top of the stationary volume of less buoyant aqueous reference electrolyte 29, external load circuit 200 comprised of test leads 57 and 58, output terminals 30 and 31, variable load resistance circuit 18 comprised of single pole single through load switch 50 connected to test lead 57 at point 41 and connected to variable load resistor 49 at point 42, variable load resistor 49 with variable load resistor tap 48 connected to test lead 58 at point 45, direction of electron flow e, direction of earth's gravitational field 40. A ball valve handle 16 is shown in the valve open position.

Solid anode atoms of the first chemical species (for example solid aluminum atoms) on the surface of anode 25 are in immediate contact with less buoyant aqueous reactant electrolyte 29 (for example aqueous copper chloride) of the second chemical species forming an active dissimilar chemical species anode/electrolyte junction 26, wherein the concentration of the first chemical species (for example solid aluminum atoms) within the solid anode 25 is 100 percent by weight, and wherein the concentration of the first chemical species (for example aluminum cations) within the less buoyant aqueous reactant electrolyte 29 of the second chemical species (for example copper chloride) is 0 percent by weight, forming a concentration gradient of the first chemical species across the anode/electrolyte junction 26, for example 100 percent aluminum on the anode 25 side of the anode/electrolyte junction 26 and 0 percent aluminum on the reactant 29 side of the anode/electrolyte junction 26.

The force of the concentration gradient across anode/electrolyte junction 26 provides the driving force necessary to drive the spontaneous oxidation of atoms on the surface of the anode 25 into product cations C1^ as the two sides of the anode/electrolyte junction 26 attempt to equalize the two different concentrations of the first chemical species across the concentration gradient across the anode/electrolyte junction 26.

Solid anode atoms of the first chemical species on the surface of the anode 25 spontaneously oxidize into aqueous product cations C1^ of the first chemical species and dissolve into the aqueous reactant electrolyte 29 of the second chemical species, thus reducing the concentration gradient across anode/electrolyte junction 26, wherein the anode 25 side of the anode/electrolyte junction 26 has 100 percent concentration of the first chemical species and the aqueous reactant electrolyte 29 side of the anode/electrolyte junction 26 has more than 0 percent concentration of the first chemical species in immediate contact with the anode 25.

The electrons e produced by the spontaneous oxidation reaction exit the cell through the anode output terminal 23 and travel through external load circuit 200, through external load resistance 49 and reenter the cell through the cathode output terminal 3 where said electrons on the surface of cathode 5 combine with aqueous reference cations C1* to spontaneously reduce reference cations C1* out of solution as solid atoms plated out onto the surface of cathode 5.

More buoyant oxidized aqueous product cations C1^ (for example aluminum product cations each cation having an atomic weight of 26.981539) rise in the direction opposite to that of earth's gravity 40 as depicted by the upward pointing dashed arrow 19 through the stationary volume of less buoyant aqueous reactant electrolyte 29 (for example having copper cations having an atomic weight of 63.546) until said more buoyant oxidized aqueous product cations C1^ enter the stationary volume of more buoyant aqueous reference electrolyte 9 (for example having aluminum cations having an atomic weight of 26.981539), wherein aqueous product cations C1^ attain neutral buoyancy within the stationary volume of more buoyant aqueous reference electrolyte 9 where the rising of aqueous product cations C1^ stops, wherein said oxidized aqueous product cations C1^ become aqueous reference cations C1 and become part of the stationary volume of more buoyant aqueous reference electrolyte 9, wherein the aqueous product cations C1 resupply the stationary volume of more buoyant aqueous reference electrolyte 9 with new aqueous cations C1 of the first chemical species that were lost to the solid cathode 5 due to the reduction and plating out of solution of cations C1* of the first chemical species onto the surface of cathode 5 of the first chemical species.

Aqueous reference cations C1* of the first chemical species in immediate contact with the surface of cathode 5 reduce out of solution as solid atoms of the first chemical species and plate out onto the surface of cathode 5.

The action of gravity entering the cell and by way of positive buoyancy force rising the more buoyant oxidized aqueous product cations C1^ away from the immediate vicinity of the anode 25 increases the concentration gradient across anode/electrolyte junction 26. The anode/electrolyte junction 26 wants to equalize the two different concentrations of the first chemical species across the concentration gradient across the anode/electrolyte junction 26 strongly enough that it will give the electrons sufficient push (the cell potential) that they may be used to do electrical work.

When the single pole single throw load switch 50 is placed in the open position as shown, the external variable load resistance 18 is not connected to gravoltaic cell 120 and variable load resistance 49 does not appear across gravoltaic cell 120 electrode terminals 3 and 23. When the single pole single throw load switch 50 is placed in the open position as shown, gravoltaic cell 120 open circuit cell voltage appears across external load circuit 200 output terminals 30 and 31. When the single pole single throw load switch 50 is placed in the closed position (not shown in FIG. 6), the electrons e produced by the spontaneous oxidation reactions at anode 25 exit the cell through the anode output terminal 23 and travel through external variable load resistance 18, through single pole single throw load switch 50, through variable load resistance 49 and reenter the cell through the cathode output terminal 3. When the single pole single throw load switch 50 is placed in the closed position (not shown in FIG. 65), gravoltaic cell 120 closed circuit cell voltage appears across external load circuit 200 output terminals 30 and 31. When the single pole single throw load switch 50 is placed in the closed position (not shown in FIG. 6), the value of load resistance ohms placed across gravoltaic cell 120 output terminals 3 and 23 may be varied by adjusting variable load resistance 49 tap 48 to the desired value.

Figure 7:
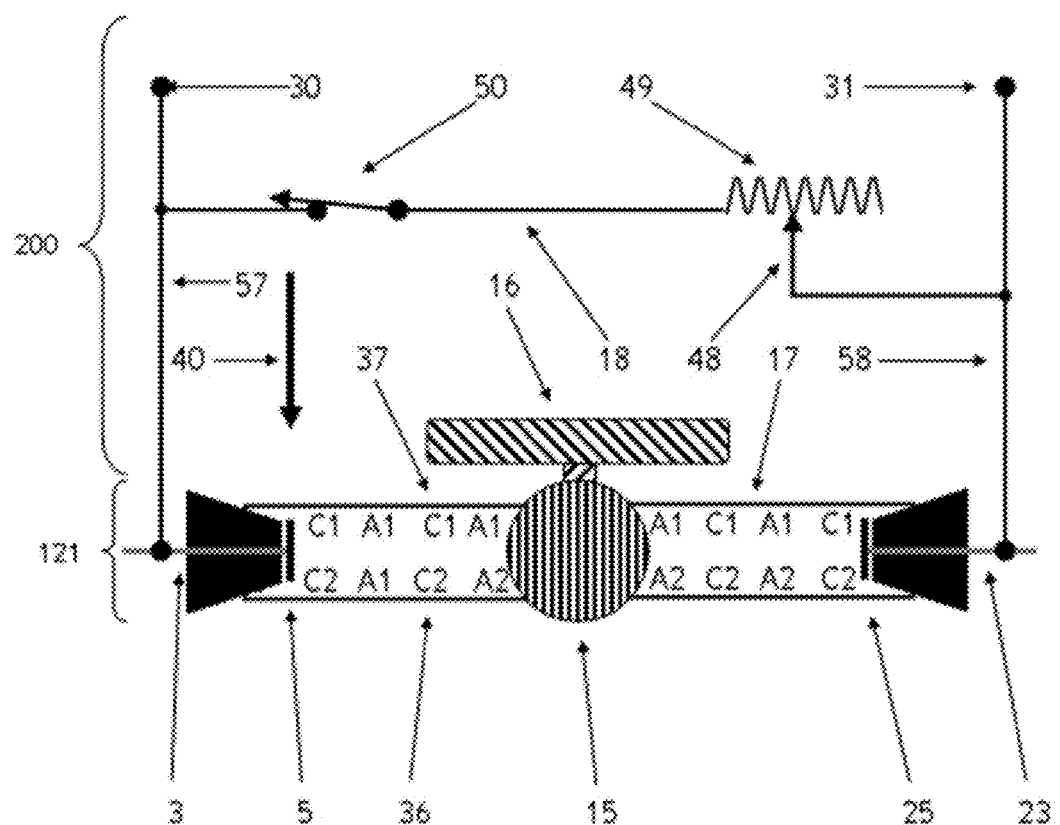
FIG. 7 depicts a horizontally oriented controlled gravoltaic cell of the present invention connected to an external load circuit, with the ball valve handle shown in the valve open position.

FIG. 7 depicts a horizontally oriented positive buoyancy embodiment of the present invention comprised of the positive buoyancy embodiment of the present invention 121 depicted in FIG. 6 rotated counter-clockwise by 90 degrees to a horizontal orientation so that the direction of gravity of the earth 40 is perpendicular to the normal length of the cell 121 and external load circuit 200. Only the relevant elements unique to FIG. 7 are shown in FIG. 7. Reaction vessel 17 is horizontally oriented with respect to the direction of gravity 40, wherein the less buoyant reactant cations C2 of the reactant electrolyte have sunk to the lower portion of the cell 36 and the more buoyant reference cations C1 of the reference electrolyte have risen to the upper portion of the cell 37.

Equal amounts of C1 and C2 are in immediate contact with cathode 5 and with anode 25. Said equal amounts of C1 and C2 in immediate contact with cathode 5 and with anode 25 result in identical electrode reactions occurring at cathode 5 and at anode 25, said resulting identical electrode reactions at cathode 5 and at anode 25 cancel each other out so that the net result is zero volts appearing across the electrode terminals 3 and 23, and zero volts appearing across the external load circuit 200 test leads 57, and zero volts appearing across the external load circuit 200 output terminals 30 and 31.

With zero volts appearing across the electrode terminals 3 and 23 and with load switch 50 in the closed position, no electric current flows through external variable load resistance circuit 18 and no electric current flow through the variable load resistance 49 and no electric energy is dissipated by load resistance 49. In the horizontal orientation gravoltaic cell 121 cannot generate electric energy. The ball valve handle shown 16 is in the valve open position.

The same net result of zero volts appearing across the electrode terminals 3 and 23 and with load switch 50 in the closed position, no electric current flows through external variable load resistance circuit 18 and no electric current flow through the variable load resistance 49 and no electric energy is dissipated by load resistance 49 would occur if the positive buoyancy embodiment of the present invention depicted in FIG. 6 were rotated clockwise by 90 degrees, and the same net result would occur if the negative buoyancy embodiment of the present invention depicted in FIG. 5 were rotated counter clockwise by 90 degrees, and the same net result would occur if the negative buoyancy embodiment of the present invention depicted in FIG. 5 were rotated clockwise by 90 degrees.

It is claimed that the normally vertically oriented gravoltaic cell of the present invention is a transducer that converts gravitational force into electromotive force strong enough to push electrons through an external electric load resistance, to that end a horizontally oriented control cell method is used as a reference against which the normally vertically oriented gravoltaic cell are measured. The horizontal orientation of the control cell simulates a zero gravity environment as well as possible on earth in order to remove the influence of gravity from the control cell as much as possible on earth. The horizontal orientation of the control cell also provides a baseline reference data set that serves as one of several measures to rank the performance of the experimental vertically oriented gravoltaic cells in earth's gravity. Though not an ideal control method, nonetheless until a better control method is found it will have to do.

A relevant prior art example that also does not utilize porous barriers or salt bridges to maintain a stable interface between the two electrolytes is the vertically oriented "Copper (II) Concentration Cell" from the University of Arizona: Chemistry TOPIC: Electrochemistry, Demo-035.

Figure 9:
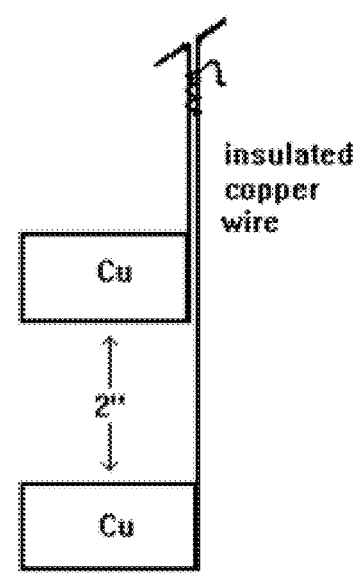
FIG. 9 depicts the figure referred to in the "Copper (II) Concentration Cell" from the University of Arizona: Chemistry TOPIC: Electrochemistry, Demo-035.
Figure 10:
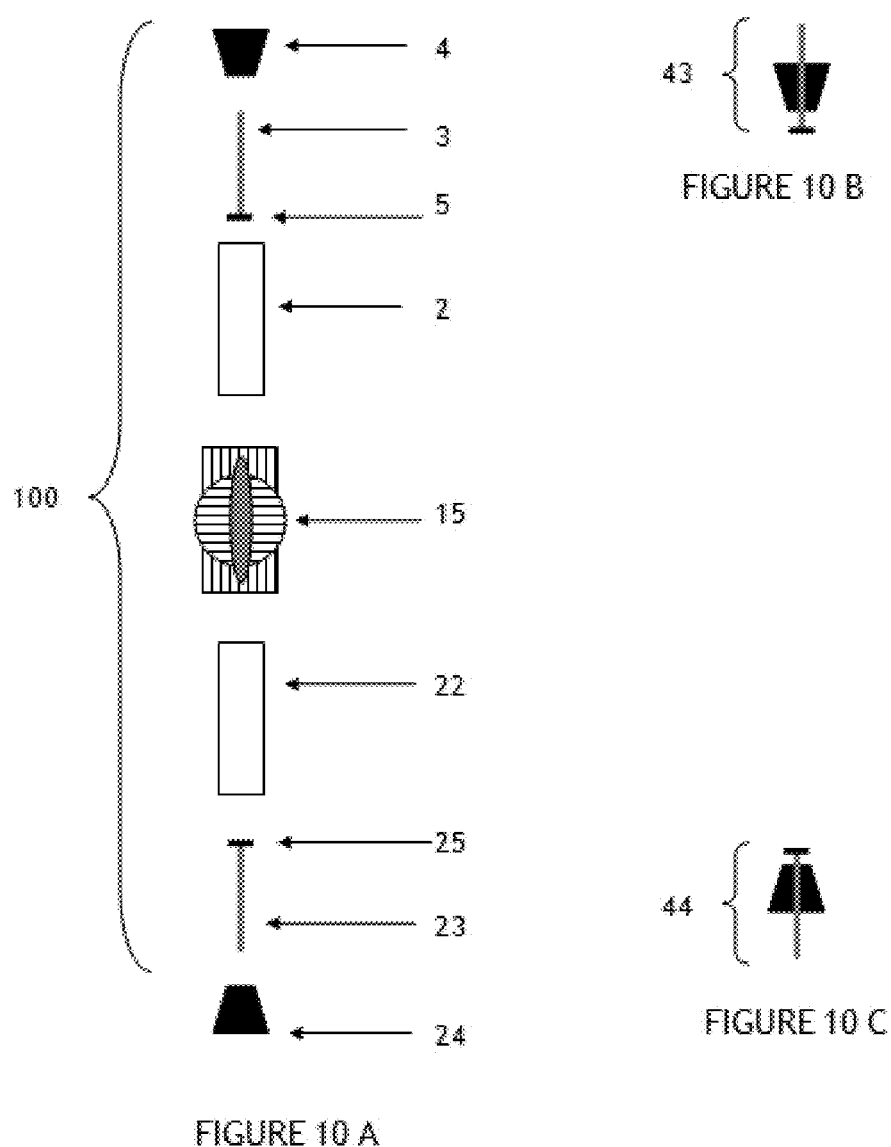
FIG. 10A depicts an exploded view of an empty gravoltaic cell body comprising, a first rubber stopper, a first electrode terminal, a first electrode, a first compartment, a ball valve shown front view and in the open position, a second compartment, a second electrode, a second electrode terminal, and a second rubber stopper.
FIG. 10B depicts the first rubber stopper and the first electrode terminal and the first electrode comprise a first electrode assembly.
FIG. 10C depicts the second electrode and the second electrode terminal and the second rubber stopper comprise a second electrode assembly.

"The apparatus comprises a pair of electrodes that are vertical and co-planar, and fit easily into the container (see figure) ((See FIG. 9 of the immediate application)). The electrodes should be separated from each other by about 2" and be soldered to thick, insulated copper wires (14 or 16 gauge household electrical system wiring works well). Cover the exposed solder with paint or epoxy. Tie the wires together so as to maintain the spacing and orientation of the electrodes. Place a hook on the output wires so that when the hook is placed over the lip of the container, the lower electrode will be suspended about 1 cm from the bottom of the container.

Presentation

Place the container on the ring stand and pour in enough 0.01 M CuSO4 electrolyte to reach the mark. Attach the iron ring to the ring stand and place the separatory funnel in it so that the tubing just reaches the bottom of the container. Pour the 1 M CuSO4 electrolyte through the funnel into the separatory funnel. Open the stopcock slowly, and add the 1 M CuSO4 electrolyte so as to layer it below the 0.01 M CuSO4 electrolyte until the interface between the electrolytes reaches the mark. Remove the separatory funnel and iron ring. Slide the electrode assembly into the container. Connect the millivolt meter and measure the potential. If the meter can measure current at the sub-milliamp level, make that measurement as well.

DISCUSSION

The Nernst equation (below) can be used to predict the voltage of this cell. For most $$\xi_{cell} = \xi^0 - \frac{0.059 \text{ V}}{n} \log Q$$

electrochemical cells the second term on the right side of the equation is so small that it is rendered essentially invisible by the measurement errors in the larger term before it. In the case of this cell, however, the cathode and anode reactions are the same, so the standard potential, °, is zero, and any cell potential is derived from the second term. The magnitude of this term is easy to calculate, because $$Q = \frac{[Cu^{2+}]_{anode}}{[Cu^{2+}]_{cathode}} = 10^{-2}$$

Log Q=−2, and the minus sign cancels the minus in the Nernst equation, while the 2 cancels the n (because Cu2++

2e_>Cu). What is left is $\xi°\_cell=0.059$ V. This result should be viewed with a certain amount of skepticism, since the system is far from ideal, but in practice the measurement will fall in the 50-70 mV range with luck.

Notes

The interface between the two electrolytes is stable for several hours, so the demonstration can be repeated without using any more copper electrolytes. A certain amount of diffusion of the electrolytes into each other will not change the cell potential so long as the diffusion does not reach the area of the electrodes."

The claimed 50-70 millivolts is an open circuit measurement, measuring cell potential but not closed circuit (not under load) voltage. The copper (II) concentration cell claims to convert the potential energy of a concentration difference into electromotive force strong enough to push electrons through an external electric load resistance. However, in practice, connecting a 47,000 ohm load resistance across the anode and cathode reduces the measured cell potential from the claimed 50-70 millivolts to less than 1 millivolt closed circuit volts, rendering the copper (II) concentration virtually useless as an energy source. The copper (II) concentration is an interesting demonstration but not a viable source of electric energy. The four graphs included in this specification demonstrate that the gravoltaic cells of the present invention are designed to work under a 47,000 ohm load resistance across the anode and cathode.

Interface Stability

Another problem with the "Copper (II) Concentration Cell" of the University of Arizona can be found described in its own notes "The interface between the two electrolytes is stable for several hours." The method of operation for concentration cells is to destabilize the interface by equalizing the concentration difference between the two solutions through a diffusion reaction so that the free energy of the diffusion reaction may be used to generate electricity.

For the above copper II concentration cell, the two layers of electrolyte solutions are both comprised of the same components (water, copper sulfate and sulfuric acid) of the same atomic weight at two different concentrations. As such the separation of the two layers of electrolyte solutions is not seen as due to electrolyte stratification based on the difference of atomic weights as disclosed in U.S. Pat. No. 8,288,995 (Jimbo) and U.S. Pat. No. 4,565,748 (Dahl), but rather the separation of the two layers of electrolyte solutions is seen to be due to differences in concentration weight.

The preferred embodiments of the present invention utilize a more buoyant (less atomic weight) stationary volume of electrolyte that floats on top of a less buoyant (more atomic weight) stationary volume of electrolyte based on differences in atomic weight between the two electrolytes. The preferred embodiments of the present invention have a buoyant object to float which is the more buoyant less atomic weight stationary volume of electrolyte, and a fluid to float on which is the less buoyant more atomic weight stationary volume of electrolyte wherein the two separate and stationary volumes are held separate by buoyancy forces acting on differences in atomic weight. The buoyancy separation based on differences in atomic weight between the two stationary volumes of electrolytes helps maintain an interface between the two stationary volumes of electrolytes for two to four or more days depending on the properties of the two electrolytes. One of the several purposes of the present invention is to further study and define said properties and to develop longer lasting interfaces.

Turbulence, Agitation

Another problem with the "Copper (II) Concentration Cell" of the University of Arizona is the turbulence and agitation created within the two electrolytes by the act of adding the one M CuSO4 electrolyte so as to layer it below the 0.01 M CuSO4 electrolyte. Such turbulence and agitation causes some mixing and cross contamination of the two electrolytes into each other resulting in some reduction of the cell voltage for a given load resistance. The preferred embodiments of the present invention utilize a ball valve between the two compartments that minimizes said turbulence and agitation.

Figure 8:
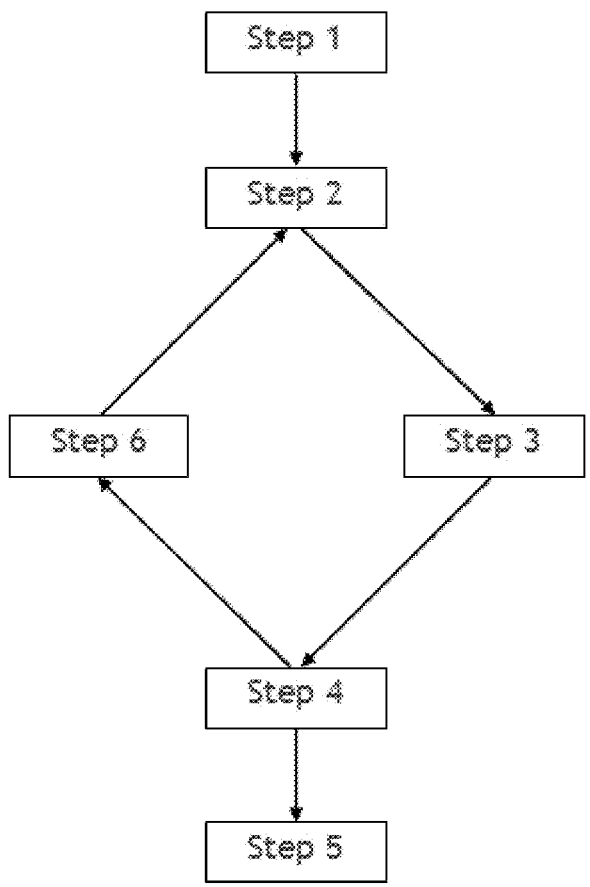
FIG. 8, depicts a brief overview of the operating principles of the gravity-sustained electrochemically active dissimilar anode/cation chemical species junction gravoltaic cell of the present invention.

Referring now to FIG. 8, the gravoltaic cells of the present invention are closed systems. In a closed system, no mass may be transferred in or out of the system boundaries. The system always contains the same amount of matter, but heat and work can be exchanged across the boundary of the system. Gravitational work enters the cell at step 1 in the form of buoyancy forces at step 2. The buoyancy forces are converted to electric energy that exits the cell at step 4. Hereafter set forth is a brief overview of the operating principles of the gravity-sustained electrochemically active dissimilar chemical species anode/cation junction gravoltaic cell of the present invention:

Step 1—gravitational potential energy continuously enters the gravoltaic cell of the present invention from the outside world.

Step 2—Gravitational potential energy from the outside world at step 1 acts to continuously increase the chemical species concentration gradient across the anode/electrolyte junction that is being continuously reduced in step 6 thus continuously renewing the high chemical species concentration gradient of the first chemical species across the anode/electrolyte junction.

For a non-limiting example the negative buoyancy embodiments of the present invention comprised of a copper anode and a copper cathode and a calcium chloride reactant electrolyte, negative buoyancy causes the less buoyant oxidized copper product cations to sink through the calcium chloride reactant electrolyte and away from the anode thus quickly removing the buildup of copper cations away from the surface of the copper anode thus increasing the concentration gradient across the anode/electrolyte junction. By quickly removing the buildup of copper cations away from the surface of the copper anode a high concentration gradient across the anode/electrolyte junction of the gravoltaic cell of the present invention is renewed simultaneously with discharging. Thus gravitational potential energy is converted to stored mechanical potential energy in the form of a high concentration gradient across the anode/electrolyte junction.

For a non-limiting example the positive buoyancy embodiments of the present invention comprised of an aluminum anode and an aluminum cathode and a copper chloride reactant electrolyte, positive buoyancy causes the more buoyant aluminum oxidized product cations to rise through the copper chloride reactant electrolyte and away from the anode thus quickly removing the buildup of aluminum cations away from the surface of the aluminum anode thus increasing the concentration gradient across the anode/electrolyte junction. By quickly removing the buildup of aluminum cations away from the surface of the copper anode a high concentration gradient across the anode/electrolyte junction of the gravoltaic cell of the present invention is renewed or increased simultaneously with discharging. Thus gravitational potential energy is converted to stored mechanical potential energy in the form of a high concentration gradient across the anode/electrolyte junction.

Step 3—Spontaneous oxidation reactions occur at the anode and spontaneous reduction reactions occur at the cathode, converting said stored mechanical potential energy of a high concentration gradient across the anode/electrolyte junction into stored electric potential energy in the form of electric potential across the output terminals of the cell.

Step 4—said stored electric potential energy pushes electrons through the external electric load resistance; thus converting electric potential energy to the electric kinetic energy of moving electrons through the external electric load resistance.

Step 5—the gravitational potential energy from the outside world that entered the cell at step 1 now exits the cell back to the outside world in the form of electric kinetic energy. Thus gravitational force is transduced into electromotive force across an external electric load resistance.

Step 6—The transfer of electric energy from the cell to the external electric load resistance reduces the concentration gradient across the anode/electrolyte junction by way of the oxidation reaction at the anode, wherein anode atoms on the surface of the anode oxidize into product cations and move preferentially from the anode side of the anode/electrolyte junction into the electrolyte side of the anode/electrolyte junction wherein the concentration of reactant cations in the electrolyte side of the anode/electrolyte junction becomes diluted with product cations. This process of diluting the concentration of reactant cations in immediate contact with the anode reduces the concentration gradient across the anode/electrolyte junction. Therefore back to step 2 to renew the high concentration gradient across the anode/electrolyte junction.

All of the above steps and events occur simultaneously so that in any given instant the product cations of the first chemical species oxidized from the anode of the first chemical species are not exactly the same cations plated out onto the surface of the cathode, and the electrons produced in the oxidation reaction are not exactly the same electrons used in the reduction reaction. The gravoltaic cell is capable of doing electrical work without any net chemical reaction occurring. The number of cations of the first and of the second chemical species and the amount of electrode metal in the system does not change; it is the gravitationally induced distribution of these substances in the cell that provides the driving force.

The loss of solid anode mass due to oxidation of anode 25 equals the gain of solid cathode mass due to reduction of cation S1* so that the net amount of solid mass of the first chemical species within the cell remains unchanged during the operation of the cell.

FIGS. 10A through 20 depict the steps in setting up and carrying out an experiment using the gravoltaic cell of the present invention.

FIG. 10A depicts an exploded view of an empty gravoltaic cell body 100 comprising, a first rubber stopper 4, a first electrode terminal 3, a first electrode 5, a first compartment 2, a ball valve 15 shown front view and in the open position, a second compartment 22, a second electrode 25, a second electrode terminal 23, a second rubber stopper 24.

FIG. 10B depicts a first electrode assembly 43 comprised of the first rubber stopper 4 of FIG. 10A and the first electrode terminal 3 of FIG. 10A and the first electrode 5 of FIG. 10A comprise.

FIG. 10C depicts a second electrode assembly 44 comprised of the second rubber stopper 24 of FIG. 10A, and the second electrode terminal 23 and of FIG. 10A and the second electrode 25 of FIG. 10A.

Figure 11:
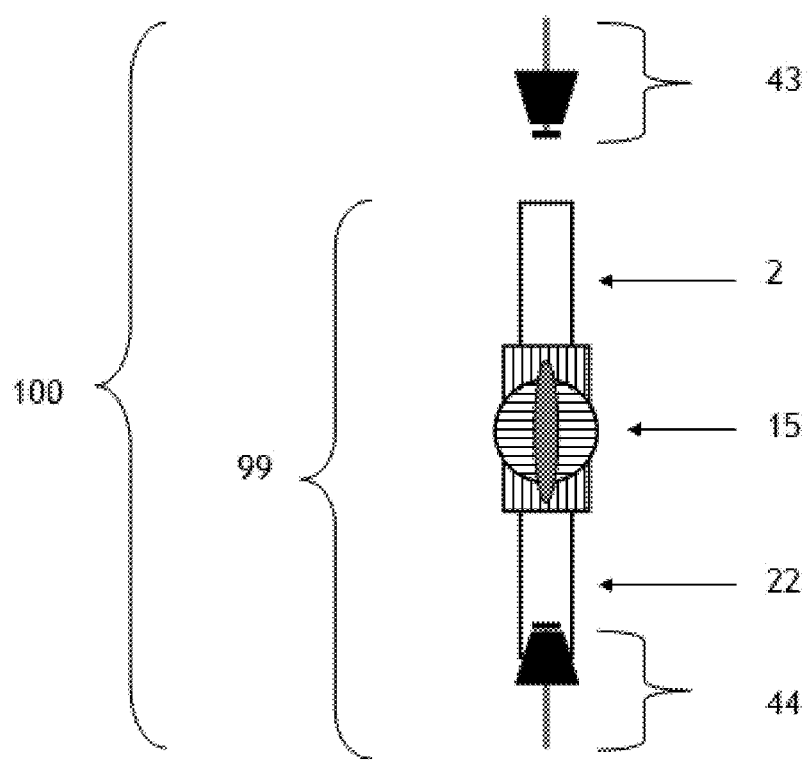
FIG. 11 depicts a test assembly comprising a first electrode assembly removed from a first compartment, and a subassembly comprised of a first compartment, with a ball valve shown in front view and in the open position, with a second compartment and a second electrode assembly inserted into the second compartment.

FIG. 11 depicts an empty test assembly 100 with the first electrode assembly 43 removed from the first compartment 2 and subassembly 99 comprised of a first compartment 2, a ball valve 15 shown in front view and in the open position, a second compartment 22 and a second electrode assembly 44 inserted into the second compartment 22.

Figure 12:
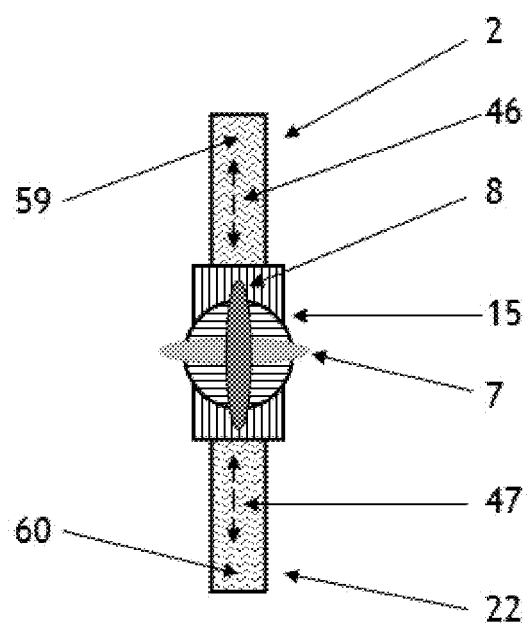
FIG. 12 depict a ball valve placed between two compartments with the ball valve shown front view and in the open position and in the closed position, wherein dashed double arrows depict the vertical displacement of the volumes of electrolytes 'avoided' by the use of the ball valve. The ball valve is transitioned from the open position to the closed position without any vertical displacement of electrolytic fluids.

FIG. 12 depicts ball valve 15 placed between compartment 2 and compartment 22 with the ball valve 15 is shown front view and in the open position 8 and in the closed position 7, wherein dashed double arrows 46 and 47 depict the vertical displacement of the volumes of electrolytes 59 and 60 'avoided' by the use of the ball type valve. The ball valve is transitioned from the open position to the closed position without any vertical displacement of the fluids 59 and 60.

Figure 13:
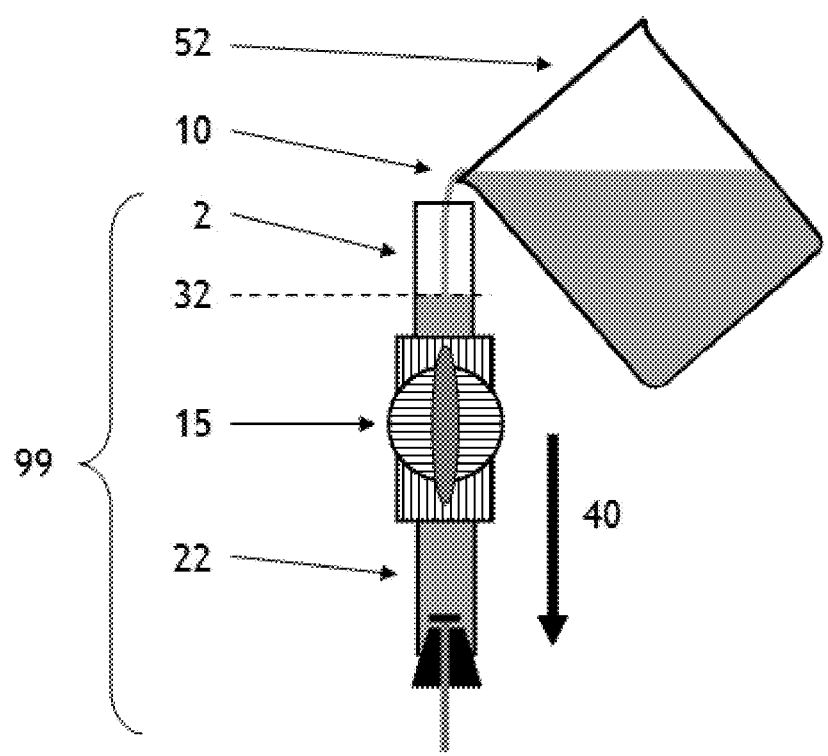
FIG. 13 depicts a subassembly wherein the front view of the ball valve is shown in the open position and the second compartment is being filled with a second electrolyte solution from a beaker, wherein the second electrolyte solution is poured through the first compartment until the level of second electrolyte solution rises to the dotted line when the pouring of the second electrolyte solution is stopped.

FIG. 13 depicts subassembly 99 wherein the ball valve 15 is shown front view and in the open position and the second compartment 22 being filled with a second electrolyte 10 from beaker 52, and the direction of earth's gravity 40 wherein the second electrolyte 10 is poured through the first compartment 2 until the level of second electrolyte 10 rises to the dotted line 32 when the pouring of the second electrolyte 10 is stopped.

Figure 14:
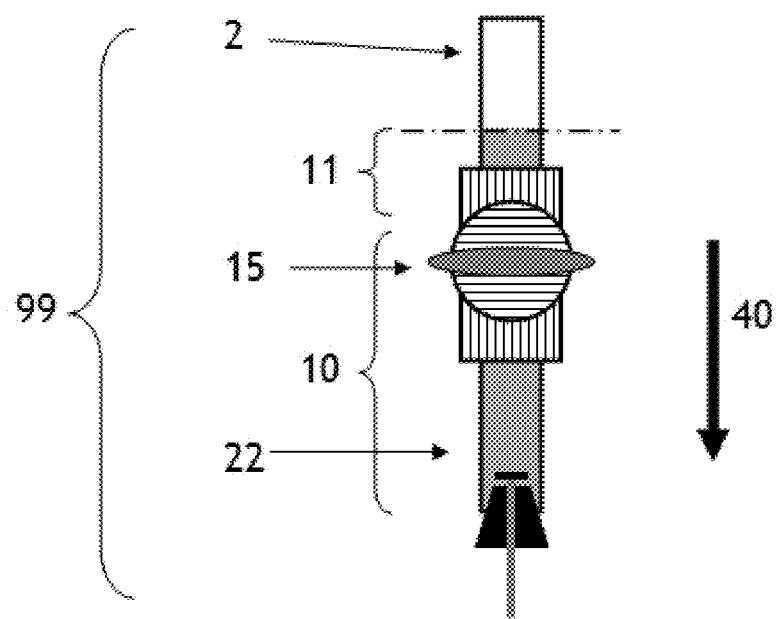
FIG. 14 depicts a subassembly with the ball valve shown in front view and in the closed position, the second compartment being full with less a buoyant electrolyte, excess less buoyant electrolyte in the first compartment.

FIG. 14 depicts subassembly 99 with ball valve 15 shown front view and in the closed position; second compartment 22 is full with the second electrolyte 10, excess second electrolyte 11 in the first compartment 2, and the direction of earth's gravity 40.

Figure 15:
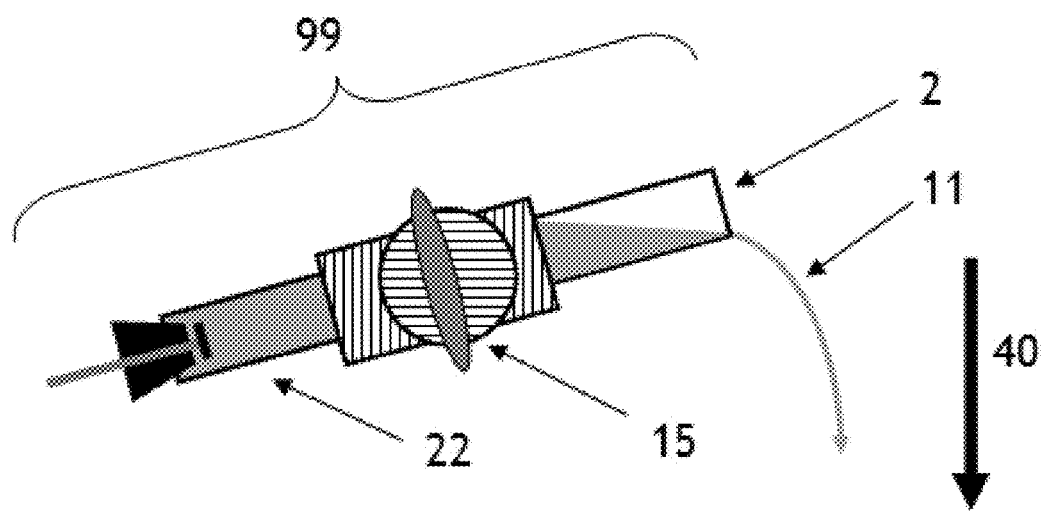
FIG. 15 depicts a subassembly with the ball valve in a closed position, and the excess second electrolyte in the first compartment being dumped out and the first compartment. The second compartment is isolated from the first compartment by the closed ball valve so that the electrolyte within second compartment is not dumped out along with excess electrolyte.

FIG. 15 depicts subassembly 99 with ball valve 15 closed, and the excess second electrolyte solution 11 in the first compartment 2 being dumped out. Second compartment 22 is isolated from the first compartment 2 by closed ball valve 15 so that the second electrolyte solution within second compartment 22 is not dumped out along with excess electrolyte solution 11.

Figure 16:
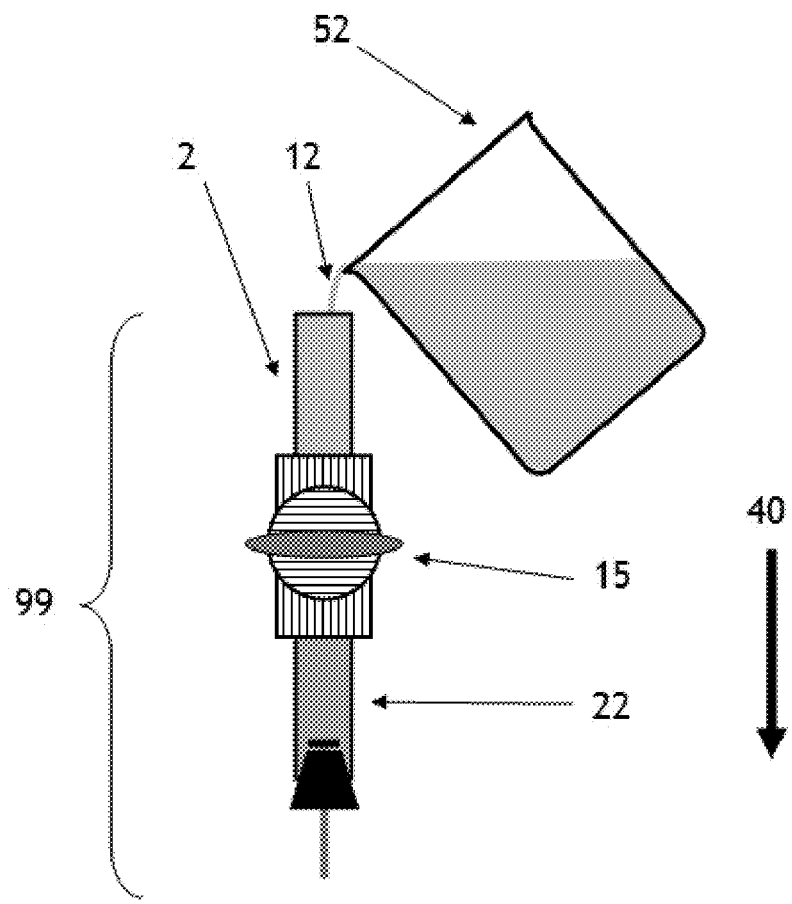
FIG. 16 depicts a subassembly with the ball valve shown in front view and in the closed position where the first compartment is being filled with a more buoyant electrolyte from a beaker to the top of the first compartment, and the direction of earth's gravity. The second compartment is isolated from the first compartment by the closed ball valve so that the more buoyant electrolyte does not contaminate the electrolyte within second compartment.

FIG. 16 depicts subassembly 99 with ball valve 15 shown in front view and in the closed position where the first compartment 2 is being filled with a first electrolyte 12 from beaker 52 to the top of the first compartment 2, and the direction of earth's gravity 40. Second compartment 22 is isolated from the first compartment 2 by closed ball valve 15 so that the first electrolyte 12 does not contaminate the second electrolyte within second compartment 22.

Figure 17:
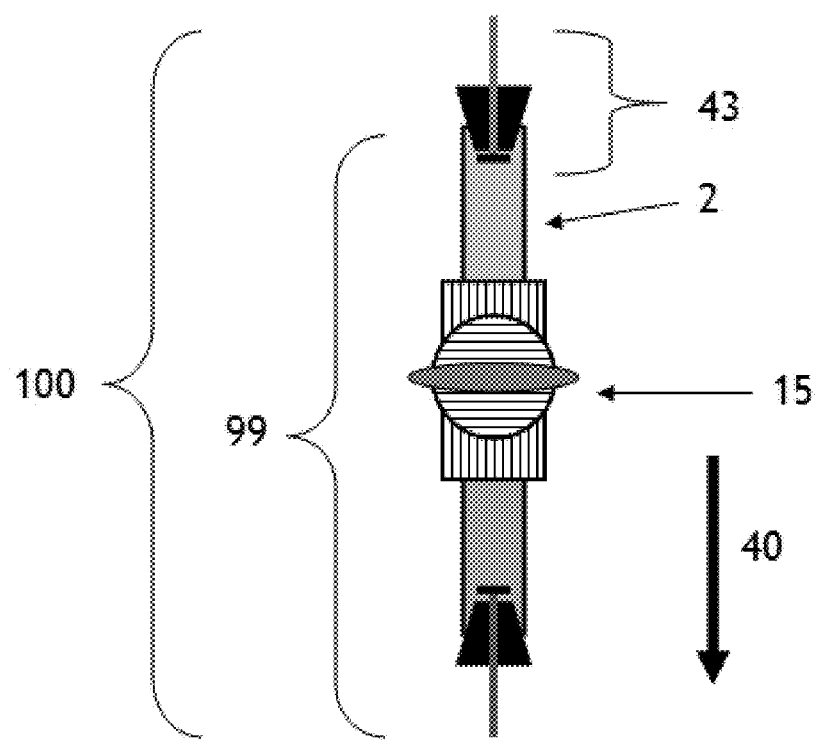
FIG. 17 depicts a test assembly comprised of subassembly with a ball valve shown front view and in the closed position and with the first electrode assembly inserted into a first compartment.

FIG. 17 depicts test assembly 100 comprised of subassembly 99 with ball valve 15 shown front view and in the closed position and with the first electrode assembly 43 inserted into the first compartment 2, and the direction of earth's gravity 40.

Figure 18:
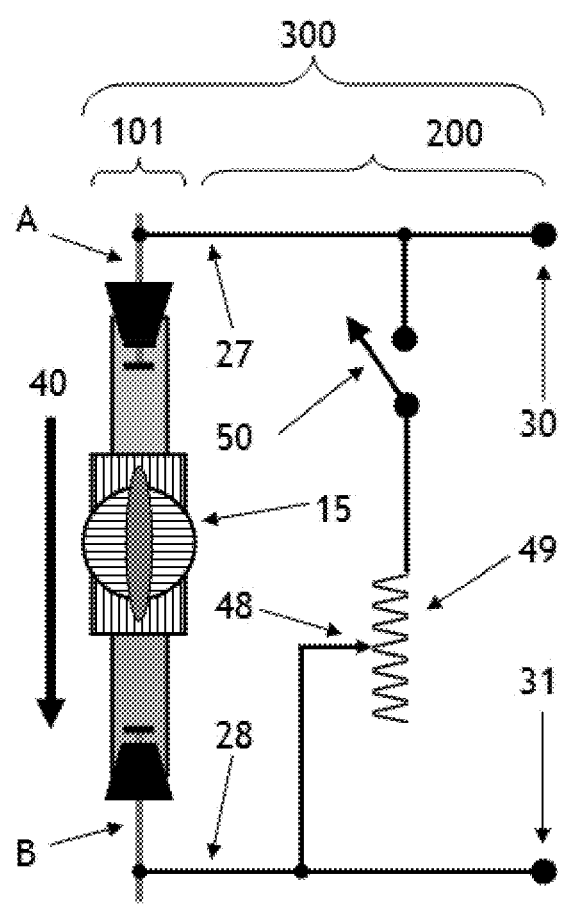
FIG. 18 depicts a test unit comprised of a generic "cell under test" (where the depicted cell is either a positive buoyancy embodiment of the present invention or a negative buoyancy embodiment of the present invention) connected to an external load circuit.

FIG. 18 depicts test unit 300 comprised of a generic 'cell under test' 101 (where generic means the depicted cell in FIG. 18 is either a positive buoyancy embodiment of the present invention or a negative buoyancy embodiment of the present invention) wherein 'cell under test' 101 is comprised of test assembly 100 depicted in FIG. 17 with ball valve 15 placed in the open position. Electrode terminals A and B are also generic meaning that if A is the anode then B is the cathode and if A is the cathode then B is the anode. Test unit 300 is further comprised of variable load circuit 200 comprised of input leads 27 and 28, load switch 50, variable load resistor 49 with variable load resistor tap 48 and output terminals 30 and 31. Input lead 27 is connected to generic 'cell under test' 101 electrode terminal A, and input lead 28 is connected to generic 'cell under test' 101 electrode terminal B. The particular characteristic cell voltage, for any particular experimental gravoltaic cell under test, for any given test load resistance between open circuit (infinite ohms) to zero ohms, appears across output terminals 30 and 31. The combined cell under test 101 and load circuit 200 comprise a unit under test comprise test unit 300.

Figure 19:
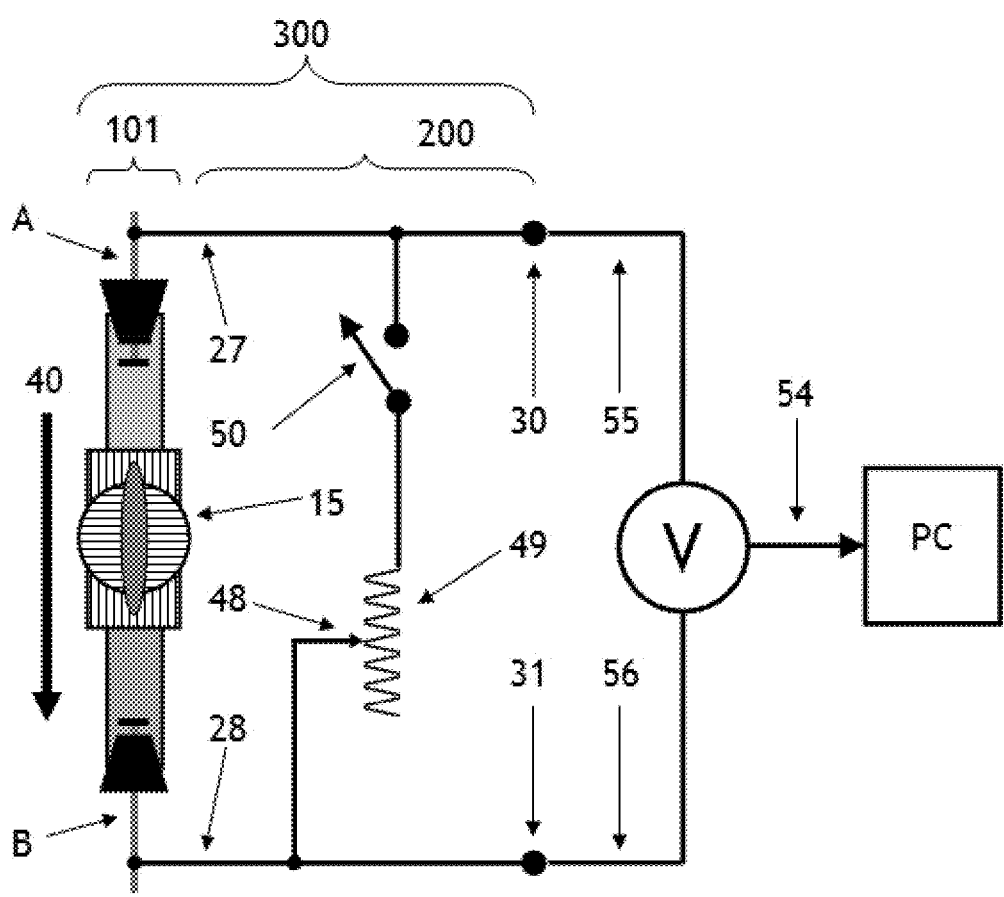
FIG. 19 depicts a test unit connected to voltmeter and a computer, wherein an external load circuit output terminal is connected to voltmeter an input lead and a load circuit output terminal is connected to the voltmeter input lead. The voltmeter has means to connect to and transmit data to the computer through an interface cable.

FIG. 19 depicts test unit 300 connected to voltmeter V and computer PC wherein load circuit 200 output terminal 30 is connected to voltmeter V input lead 55 and load circuit 200 output terminal 31 is connected to voltmeter V input lead 56. Voltmeter V has means to connect to and transmit data to computer PC through interface cable 54. Electrode terminals A and B are also generic meaning that if A is the anode then B is the cathode and if A is the cathode then B is the anode. Test unit 300 is further comprised of variable load circuit 200 comprised of input leads 27 and 28, load switch 50, variable load resistor 49 and output terminals 30 and 31. Input lead 27 is connected to generic 'cell under test' 101 electrode terminal A and load circuit 200 input lead 28 is connected to generic 'cell under test' 101 electrode terminal B.

Oxidation and reduction reactions within the cell under test 101 generate a characteristic cell voltage unique to that particular cell under test; said unique characteristic cell voltage appears as a recordable and analyzable voltage across the electrode terminals A and B and across variable load circuit output terminals 30 and 31 where voltmeter V detects said characteristic cell voltage through test leads 55 and 56 and transmits said characteristic cell voltage to computer PC for recording and analysis.

When load switch 50 is placed in the open position, as shown, the load resistance 49 does not appear across the electrode terminals A and B of generic 'cell under test' 101 through load circuit 200 input leads 27 and 28. To record and analyze the 'open circuit' cell voltage characteristics of the generic 'cell under test' 101, load switch 50 is placed in the open circuit position wherein the open circuit' cell voltage characteristics are detected by the voltmeter V and recorded for analysis by computer PC.

When load switch 50 is in the closed circuit position, not shown, the load resistance does appear across the electrode terminals of generic 'cell under test' 101 through variable load circuit 200 input leads 27 and 28. To record and analyze the 'closed circuit' cell voltage characteristics of the generic 'cell under test' 101, load switch 50 is placed in the closed position. Variable load resistor 49 is adjusted to the desired ohm value by way of variable resistor tap 48 wherein the closed circuit cell voltage characteristics are detected by the voltmeter V and recorded for analysis by computer PC.

Figure 20:
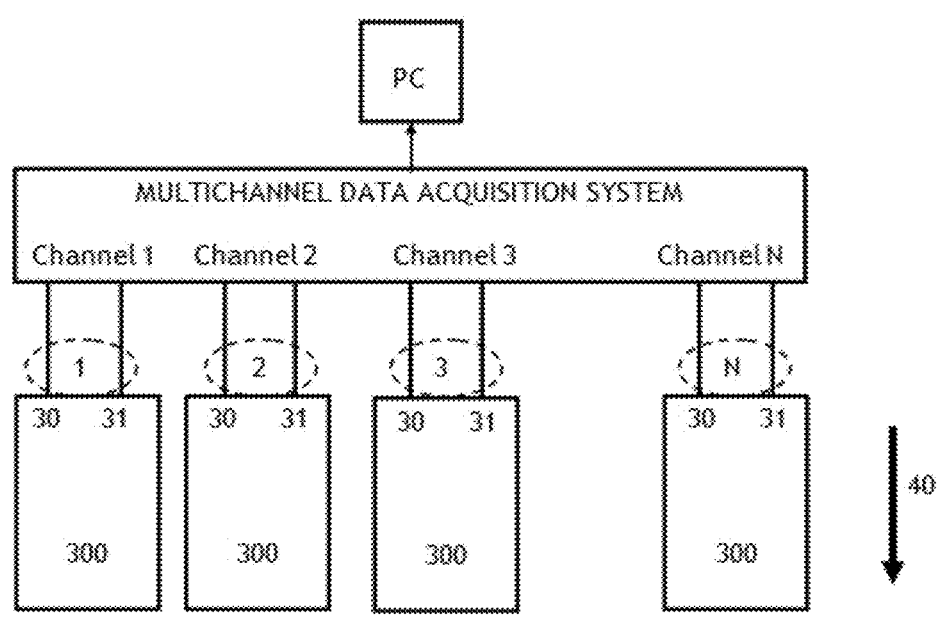
FIG. 20 depicts a number of test units wherein each test unit is comprised of an experimental variant of the gravoltaic cells of the present invention connected to variable load circuit and wherein each unique test unit is connected to a unique channel of a multichannel data acquisition system through channels, and said multichannel data acquisition system is connected to a computer.

FIG. 20 depicts 'N' number of test units 300 (where N is the total number of channels being used) wherein each test unit 300 is comprised of an experimental variant of the gravoltaic cells of the present invention connected to variable load circuit 200 and wherein each unique test unit 300 is connected to a unique channel of a multichannel data acquisition system through channels 1, 2, 3 and N, and said multichannel data acquisition system is connected to computer PC. The open and closed cell voltage characteristics of each test unit 300 is detected by the multichannel data acquisition system and recorded for analysis by computer PC.

Figure 21:
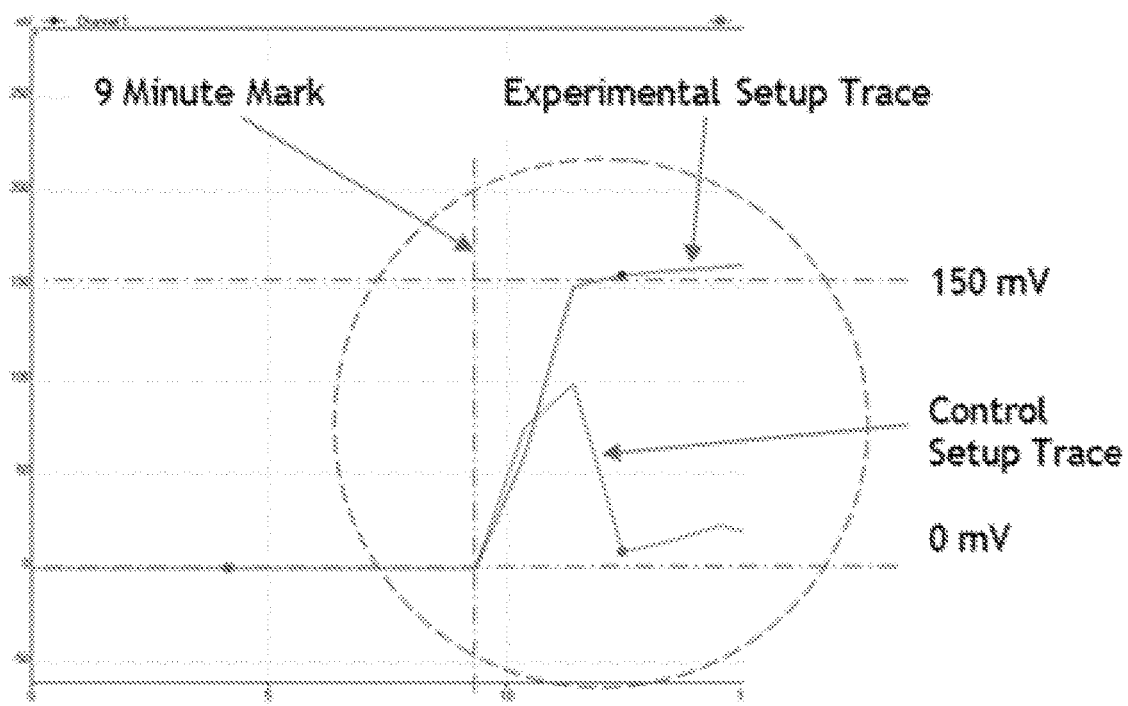
FIGS. 21 through 24 depict the comparison of the characteristic output voltages of one horizontally oriented control cell depicted in FIG. 7 and one vertically oriented experimental cell depicted in FIG. 6.

Referring now to FIG. 21 depicts the first 15 minutes of the disclosed experimental evidence. For the first 9 minutes of the graph both ball valves for both the control cell and the experimental cell were closed and no action took place. At the 9 minute mark the ball valves for both the control cell and the experimental cell were opened. Immediately following the opening of the ball valves, the voltage traces for both the control cell and the experimental cell began to rise as the two cells began producing electricity.

About one minute after opening the ball valves, the control cell trace begins to diverge significantly from the experimental cell trace as the two electrolyte solutions within the control cell begin mixing together enough to influence the control cell's output voltage.

The trace of the experimental cell continues to rise as the potential of the experimental cell is being established.

About one minute after the control cell trace begins to diverge from the experimental cell trace, the control cell trace begins to drop rapidly as the two electrolyte solutions within the control cell become increasingly mixed together, and the experimental cell's trace begins to level off.

About one minute after the control cell trace begins to drop rapidly the control cell trace has dropped close to zero volts indicating the two electrolyte solutions within the control cell are fully mixing together. The experimental cell's trace continues to rise slightly.

Figure 22:
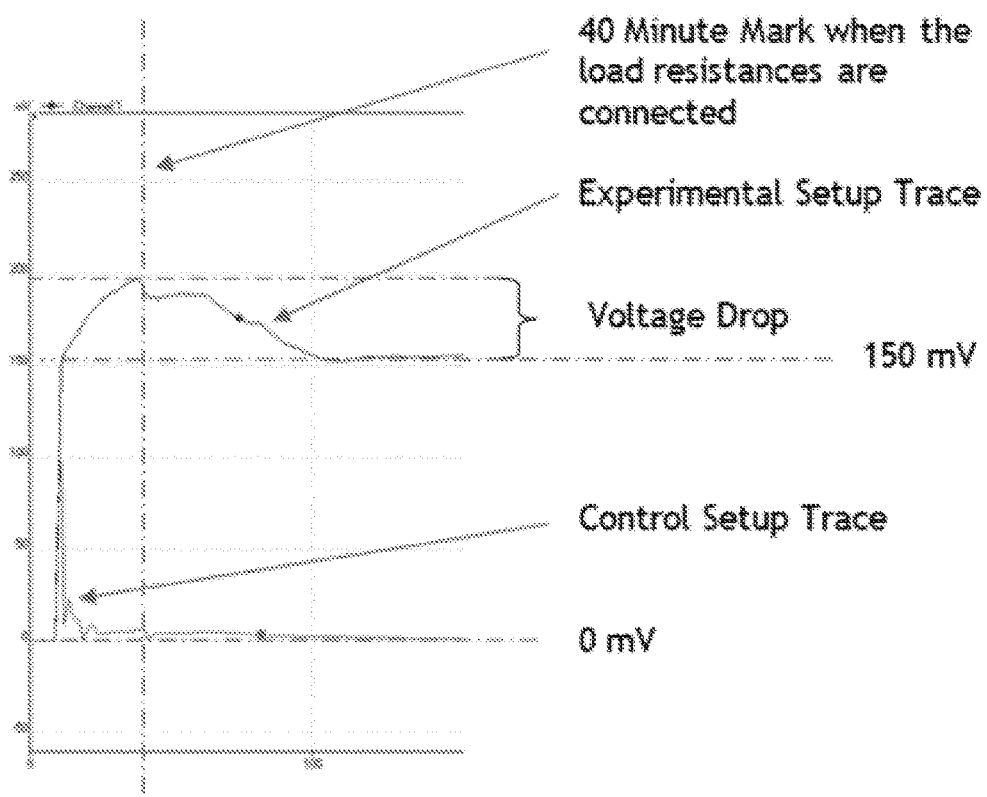

FIG. 22 depicts the loading effect of an external electrical load resistance. At the 40 minute mark an external load resistance was connected across the anodes and cathodes of both the control cell and the experimental cell. Both the experimental cell's voltage trace and the control cell's trace show an immediate reduction in cell voltage. For the control cell this drop in cell voltage is almost negligible because the control cell's cell voltage is almost zero. The experimental cell shows a slightly more significant immediate voltage drop until about the 100 minute mark where the experimental cell's cell voltage begins to level off at about 150 millivolts.

Figure 23:
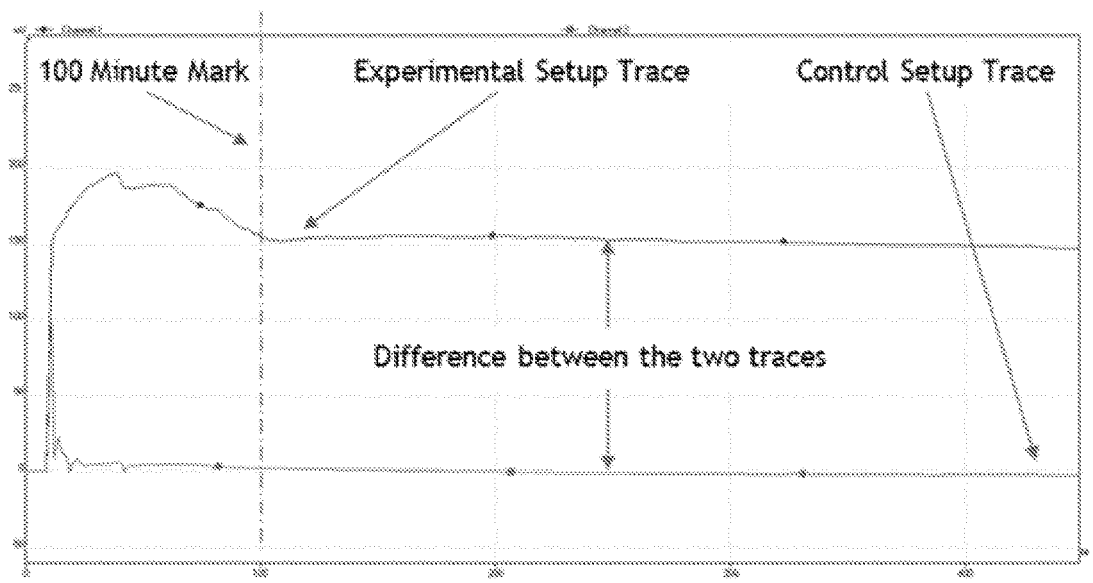

FIG. 23 depicts the difference between the control setup output energy and the experimental setup output energy. At about the 100 minute mark the experimental cell's cell voltage level off to about 150 millivolts.

Figure 24:
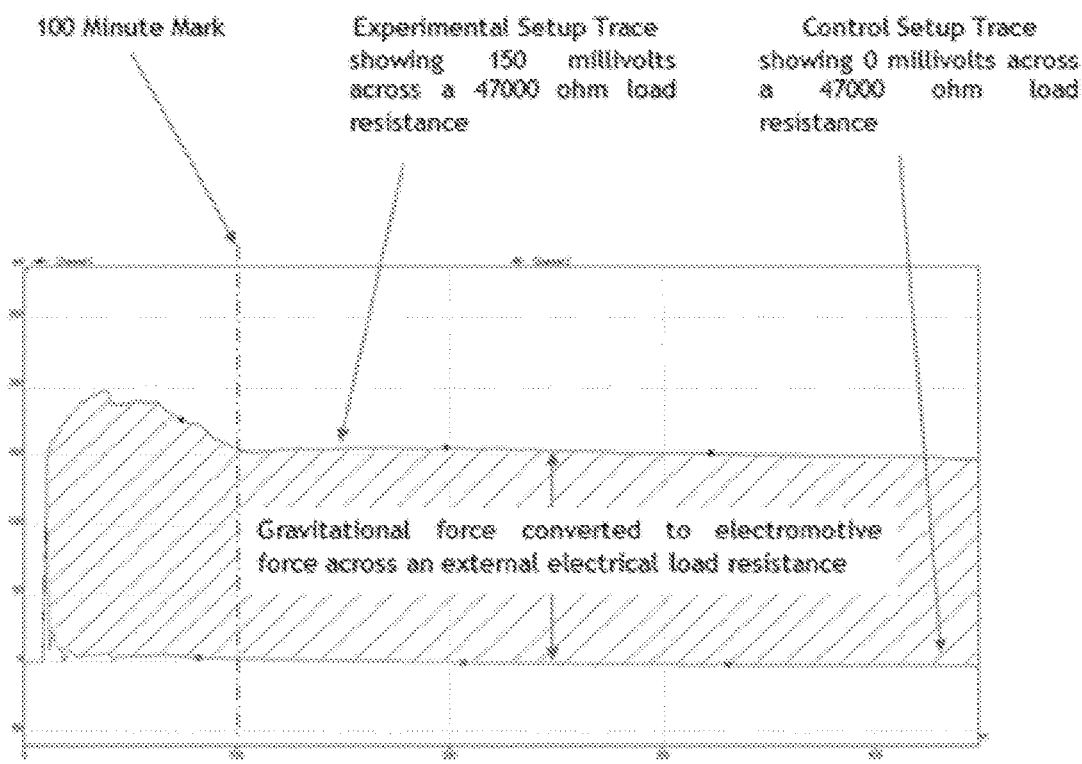

FIG. 24 depicts the gravitational energy converted to electrical energy by the experimental setup over that of the control setup.

Throughout this specification, there are various patents and patent applications and provisional applications referenced by patent number and inventor. The disclosures of these patents/applications are hereby incorporated by reference in their entireties into this specification in order to more fully describe the state-of-the-art.

It is evident that many alternatives, modifications, and variations of the mobile computer terminal of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 1 first placement
2 first compartment
3 cathode output terminal
4 rubber stopper
5 cathode layer
6 cathode/electrolyte junction layer
7 ball valve (front view) shown in the open position
8 ball valve (front view) shown in the closed position
9 aqueous reference electrolyte layer
10 level of second electrolyte in second compartment
11 excess electrolyte solution in second compartment
12 first electrolyte in a first compartment 15 ball valve
16 ball valve handle
17 reaction vessel
18 external load resistance circuit
19 arrow indicating interface direction between the volume of buoyant reactant electrolyte and stationary volume of buoyant reference electrolyte
21 second placement
22 second compartment
23 anode output terminal
24 rubber stopper
25 anode
26 anode/electrolyte junction layer
27 input lead
28 input lead
29 aqueous reference electrolyte layer
30 output terminal
31 output terminal
32 electrolyte level during pouring
33 electrolyte interface layer
36, 37 cell
40 gravitational field of earth
41, 42 point
43 first electrode assembly
44 second electrode assembly
45 point
46 double arrows depict the vertical displacement of the volumes of electrolytes
47 double arrows depict the vertical displacement of the volumes of electrolytes
48 variable load resistor tap
49 external load resistance
50 single pole single throw load switch
52 beaker
54 interface cable
55 input lead to voltmeter
56 input lead to voltmeter
57 test lead
58 test lead
59 electrolyte
60 electrolyte
97 gravoltaic cell
98 gravoltaic cell
99 subassembly
100 test assembly
101 generic "cell under test"
110 negative buoyancy embodiment
111 positive buoyancy embodiment
120 negative buoyancy embodiment
121 positive buoyancy embodiment
200 external load circuit
300 test unit

I claim:
1. A gravoltaic cell comprising:
a. a reaction vessel;
b. a first stationary homogeneous volume of dissociated aqueous reference cations having dissociated aqueous cations of a first chemical species and a second stationary homogeneous volume of dissociated aqueous reactant cations having dissociated aqueous cations of a second chemical species, said first and second distinct stationary homogeneous volumes of dissociated aqueous cations being disposed within said reaction vessel, and providing bulk solvent and anions a stationary bulk volume of a homogeneous mixture of solvent and dissociated anions collectively disposed homogeneously throughout said first and second volumes of dissociated aqueous cations; and
c. an anode junction providing electrochemically active dissimilar anode-cation chemical species junction comprising an anode of said first chemical species having a second placement in contact with a gravity-sustained stationary homogeneous volume of dissociated aqueous reactant cations of said second chemical species having a second placement, and a cathode junction providing a gravity-sustained electrochemically passive similar cathode-cation chemical species junction comprising a cathode of said first chemical species having a first placement in contact with a gravity-sustained stationary homogeneous volume of dissociated aqueous reference cations of said first chemical species having a first placement;
wherein buoyancy separation is gravitationally sustained between two distinct stationary homogeneous volumes of dissociated aqueous cations differing chemically in chemical species and differing physically in buoyancy disposed within a homogeneous stationary bulk mixture of solvent and dissociated anions within said reaction vessel, a first distinct stationary homogeneous volume of dissociated aqueous cations having a greater relative buoyancy and a second distinct stationary homogeneous volume of dissociated aqueous cations having a lesser relative buoyancy, both of said two distinct stationary homogeneous volumes of dissociated aqueous cations being held separate and stationary by a difference in relative buoyancy;
wherein said first placement of said stationary homogeneous volume of reference cation volume of said first chemical species occupying a first compartment of said reaction vessel for positive buoyancy, and said first placement of said stationary homogeneous volume of reference cation volume of said first chemical species occupying a second compartment of said reaction vessel for negative buoyancy, providing said two distinct stationary homogeneous volumes of dissociated aqueous cations differing chemically in chemical species and differing physically in buoyancy;
wherein said first compartment and said second compartment are separated by a non-conductive ball valve; and
wherein a negative buoyancy mode of said gravity-sustained electrochemically active dissimilar anode-cation chemical species junction comprising an electrically nonconductive reaction vessel, comprising said first and second compartments housing a homogeneous stationary less buoyant reference cation volumes of said first chemical species disposed in said second compartment, and said first compartment housing a homogeneous stationary more buoyant reactant cation volumes of said second chemical species disposed in said first compartment;
wherein a positive buoyancy mode of said gravity-sustained electrochemically active dissimilar anode-cation chemical species junction comprising an electrically nonconductive reaction vessel, comprising said second compartment housing a homogeneous stationary less buoyant reactant cation volumes of said second chemical species, and said first compartment housing a homogeneous stationary more buoyant reference cation volumes of said first chemical species; and wherein said first compartment and said second compartment are separated by a non-conductive valve;

wherein an electrochemical disparity between individual cations within said homogeneous stationary reactant cation volume of said second chemical species, and individual atoms of said first chemical species on said surface of said anode volume of said first chemical species;

wherein for said positive buoyancy, said more buoyant liberated cations of said first chemical species migrate upward through said reactant cation volume of said second chemical species and away from said anode of said first chemical species, said migration sustaining a chemical species disparity between said anode of said first chemical species and said reactant cation volume of said second chemical species in immediate contact with said surface of said anode of said first chemical species, said liberated cations of said first chemical species being more buoyant than said surrounding reactant cation volume of said second chemical species, said more buoyant liberated cations of said first chemical species migrating upward through said reactant cation volume of said second chemical species and away from said anode of said first chemical species;

wherein for said negative buoyancy, said less buoyant liberated cations of said first chemical species migrate downward through said reactant cation volume of said second chemical species and away from said anode of said first chemical species, said migration sustaining a chemical species disparity between said anode of said first chemical species and said reactant cation volume of said second chemical species in immediate contact with said surface of said anode of said first chemical species, said liberated cations of said first chemical species being less buoyant than said surrounding reactant cation volume of said second chemical species, said less buoyant liberated cations of said first chemical species migrating downward through said reactant cation volume of said second chemical species and away from said anode of said first chemical species;

wherein a chemical species disparity between said anode of said first chemical species and said reactant volume of said second chemical species causes atoms of said first chemical species on said surface of said anode of said first chemical species to oxidize and dissolve as liberated cations of said first chemical species into said reactant volume of said second chemical species in immediate contact with said anode of said first chemical species, liberating cations of said first chemical species tend to displace said reactant volume of said second chemical species away from said surface of said anode of said first chemical species, thus reducing said chemical species disparity, gravity by way of positive or negative buoyancy forces tending to migrate said liberated cations of said first chemical species away from said anode of said first chemical species, thereby restoring said chemical species disparity between said surface of said anode of said first chemical species and said reactant volume of said second chemical species; and wherein said gravoltaic cell converts gravitational force into electrical energy.

2. The gravoltaic cell of claim 1, wherein both said two distinct stationary homogeneous volumes of dissociated aqueous cations are held separate and stationary by a difference in relative buoyancy.

3. A gravoltaic cell comprising:
   a. a reaction vessel;
   b. a first stationary homogeneous volume of dissociated aqueous reference cations having dissociated aqueous cations of a first chemical species and a second stationary homogeneous volume of dissociated aqueous reactant cations having dissociated aqueous cations of a second chemical species, said first and second distinct stationary homogeneous volumes of dissociated aqueous cations being disposed within said reaction vessel, and providing bulk solvent and anions a stationary bulk volume of a homogeneous mixture of solvent and dissociated anions collectively disposed homogeneously throughout said first and second volumes of dissociated aqueous cations; and
   c. an anode junction providing electrochemically active dissimilar anode-cation chemical species junction comprising an anode of said first chemical species having a second placement in contact with a gravity-sustained stationary homogeneous volume of dissociated aqueous reactant cations of said second chemical species having a second placement, and a cathode junction providing a gravity-sustained electrochemically passive similar cathode-cation chemical species junction comprising a cathode of said first chemical species having a first placement in contact with a gravity-sustained stationary homogeneous volume of dissociated aqueous reference cations of said first chemical species having a first placement;

wherein buoyancy separation is gravitationally sustained between two distinct stationary homogeneous volumes of dissociated aqueous cations differing chemically in chemical species and differing physically in buoyancy disposed within a homogeneous stationary bulk mixture of solvent and dissociated anions within said reaction vessel, a first distinct stationary homogeneous volume of dissociated aqueous cations having a greater relative buoyancy and a second distinct stationary homogeneous volume of dissociated aqueous cations having a lesser relative buoyancy, both of said two distinct stationary homogeneous volumes of dissociated aqueous cations being held separate and stationary by a difference in relative buoyancy; and wherein said gravoltaic cell converts gravitational force into electrical energy.

4. The gravoltaic cell of claim 3, wherein both said two distinct stationary homogeneous volumes of dissociated aqueous cations are held separate and stationary by a difference in relative buoyancy.

5. The gravoltaic cell of claim 3, wherein a chemical species disparity between said anode volume of said first chemical species and said reactant volume of said second chemical species causes atoms of said first chemical species on said surface of said anode of said first chemical species to oxidize and dissolve as liberated cations of said first chemical species into said reactant volume of said second chemical species in immediate contact with said anode volume of said first chemical species, thereby said liberated cations of said first chemical species tend to displace said reactant volume of said second chemical species away from said surface of said anode of said first chemical species, thus reducing said chemical species disparity.

6. The gravoltaic cell of claim 3, wherein gravity by way of positive or negative buoyancy forces tends to migrate said liberated cations of said first chemical species away from said anode of said first chemical species thus restoring said relatively large chemical species disparity between said surface of said anode of said first chemical species and said reactant volume of said second chemical species.

7. A gravoltaic cell comprising:
  a. a reaction vessel;
  b. a first stationary homogeneous volume of dissociated aqueous reference cations having dissociated aqueous cations of a first chemical species and a second stationary homogeneous volume of dissociated aqueous reactant cations having dissociated aqueous cations of a second chemical species, said first and second distinct stationary homogeneous volume s of dissociated aqueous cations being disposed within said reaction vessel, and providing bulk solvent and anions a stationary bulk volume of a homogeneous mixture of solvent and dissociated anions collectively disposed homogeneously throughout said first and second volumes of dissociated aqueous cations; and
  c. an anode junction providing electrochemically active dissimilar anode-cation chemical species junction comprising an anode of said first chemical species having a second placement in contact with a gravity-sustained stationary homogeneous volume of dissociated aqueous reactant cations of said second chemical species having a second placement, and a cathode junction providing a gravity-sustained electrochemically passive similar cathode-cation chemical species junction comprising a cathode of said first chemical species having a first placement in contact with a gravity sustained stationary homogeneous volume of dissociated aqueous reference cations of said first chemical species having a first placement;
    wherein buoyancy separation is gravitationally sustained between two distinct stationary homogeneous volume s of dissociated aqueous cations differing chemically in chemical species and differing physically in buoyancy disposed within a homogeneous stationary bulk mixture of solvent and dissociated anions within said reaction vessel, a first distinct stationary homogeneous volume of dissociated aqueous cations having a greater relative buoyancy and a second distinct stationary homogeneous volume of dissociated aqueous cations having a lesser relative buoyancy, both of said two distinct stationary homogeneous volume s of dissociated aqueous cations being held separate and stationary by a difference in relative buoyancy;
    wherein an electrochemical disparity between individual cations within said homogeneous stationary reactant cation volume of said second chemical species, and individual atoms of said first chemical species on said surface of said anode of said first chemical species; and
    wherein said gravoltaic cell converts gravitational force into electrical energy.

8. The gravoltaic cell of claim 7, wherein an electrochemical disparity between individual cations within said homogeneous stationary reactant cation volume of said second chemical species, and individual atoms of said first chemical species on said surface of said anode of said first chemical species.

9. The gravoltaic cell of claim 7, wherein a chemical species disparity between said anode of said first chemical species and said reactant volume of said second chemical species causes atoms of said first chemical species on said surface of said anode of said first chemical species to oxidize and dissolve as liberated cations of said first chemical species into said reactant volume of said second chemical species in immediate contact with said anode of said first chemical species, thereby said liberated cations of said first chemical species tend to displace said reactant volume of said second chemical species away from said surface of said anode of said first chemical species, thus reducing said chemical species disparity, and gravity by way of positive or negative buoyancy forces tends to migrate said liberated cations of said first chemical species away from said anode of said first chemical species thus restoring said relatively large chemical species disparity between said surface of said anode of said first chemical species and said reactant volume of said second chemical species.

10. The gravoltaic cell of claim 7, wherein both said two distinct stationary homogeneous volumes of dissociated aqueous cations are held separate and stationary by a difference in relative buoyancy.

11. A gravoltaic cell comprising:
  a. a reaction vessel;
  b. a first stationary homogeneous volume of dissociated aqueous reference cations having dissociated aqueous cations of a first chemical species and a second stationary homogeneous volume of dissociated aqueous reactant cations having dissociated aqueous cations of a second chemical species, said first and second distinct stationary homogeneous volumes of dissociated aqueous cations being disposed within said reaction vessel, and providing bulk solvent and anions a stationary bulk volume of a homogeneous mixture of solvent and dissociated anions collectively disposed homogeneously throughout said first and second volumes of dissociated aqueous cations; and
  c. an anode junction providing electrochemically active dissimilar anode-cation chemical species junction comprising an anode of said first chemical species having a second placement in contact with a gravity-sustained stationary homogeneous volume of dissociated aqueous reactant cations of said second chemical species having a second placement, and a cathode junction providing a gravity-sustained electrochemically passive similar cathode-cation chemical species junction comprising a cathode of said first chemical species having a first placement in contact with a gravity-sustained stationary homogeneous volume of dissociated aqueous reference cations of said first chemical species having a first placement;
    wherein a first compartment and a second compartment are separated by a non-conductive ball valve; and
    wherein said first placement of said stationary homogeneous volume of reference cation volume of said first chemical species occupying a first compartment of said reaction vessel for positive buoyancy, and said first placement of said stationary homogeneous volume of reference cation volume of said first chemical species occupying a second compartment of said reaction vessel for negative buoyancy, providing said two distinct stationary homogeneous volumes of dissociated aqueous cations differing chemically in chemical species and differing in relative buoyancy;
    wherein said gravoltaic cell converts gravitational force into electrical energy.

12. The gravoltaic cell of claim 11, wherein an electrochemical disparity between individual cations within said homogeneous stationary reactant cation volume of said second chemical species, and individual atoms of said first chemical species on said surface of said anode of said first chemical species.

13. The gravoltaic cell of claim 11, wherein a chemical species disparity between said anode of said first chemical species and said reactant volume of said second chemical species causes atoms of said first chemical species on said surface of said anode of said first chemical species to oxidize and dissolve as liberated cations of said first chemical species into said reactant volume of said second chemical species in immediate contact with said anode of said first chemical species, thereby said liberated cations of said first chemical species tend to displace said reactant volume of said second chemical species away from said surface of said anode of said first chemical species, thus reducing said chemical species disparity.

14. The gravoltaic cell of claim 11, wherein gravity by way of positive or negative buoyancy forces tends to migrate said liberated cations of said first chemical species away from said anode of said first chemical species, thereby restoring said relatively large chemical species disparity between said surface of said anode of said first chemical species and said reactant volume of said second chemical species.

15. The gravoltaic cell of claim 11, wherein both said two distinct stationary homogeneous volumes of dissociated aqueous cations are held separate and stationary by a difference in relative buoyancy.

16. The gravoltaic cell of claim 11, wherein a negative buoyancy mode of said gravity-sustained electrochemically active dissimilar anode-cation chemical species junction comprising an electrically nonconductive reaction vessel, comprising said first and second compartments housing a homogeneous stationary less buoyant reference cation volumes of said first chemical species disposed in said second compartment, and said first compartment housing a homogeneous stationary more buoyant reactant cation volumes of said second chemical species disposed in said first compartment.

17. The gravoltaic cell of claim 11, wherein a positive buoyancy mode of said gravity-sustained electrochemically active dissimilar anode-cation chemical species junction comprising an electrically nonconductive reaction vessel, comprising said second compartment housing a homogeneous stationary less buoyant reactant cation volumes of said second chemical species, and said first compartment housing a homogeneous stationary more buoyant reference cation volumes of said first chemical species.

18. The gravoltaic cell of claim 11, wherein for said positive buoyancy, said more buoyant liberated cations of said first chemical species migrate upward through said reactant cation volume of said second chemical species and away from said anode of said first chemical species, said migration sustaining a chemical species disparity between said anode of said first chemical species and said reactant cation volume of said second chemical species in immediate contact with said surface of said anode of said first chemical species, said liberated cations of said first chemical species being more buoyant than said surrounding reactant cation volume of said second chemical species, said more buoyant liberated cations of said first chemical species migrating upward through said reactant cation volume of said second chemical species and away from said anode of said first chemical species.

19. The gravoltaic cell of claim 11, wherein for said negative buoyancy, said less buoyant liberated cations of said first chemical species migrate downward through said reactant cation volume of said second chemical species and away from said anode of said first chemical species, said migration sustaining a chemical species disparity between said anode of said first chemical species and said reactant cation volume of said second chemical species in immediate contact with said surface of said anode of said first chemical species, said liberated cations of said first chemical species being less buoyant than said surrounding reactant cation volume of said second chemical species, said less buoyant liberated cations of said first chemical species migrating downward through said reactant cation volume of said second chemical species and away from said anode of said first chemical species.

20. The gravoltaic cell of claim 11, wherein a chemical species disparity between said anode of said first chemical species and said reactant volume of said second chemical species causes atoms of said first chemical species on said surface of said anode of said first chemical species to oxidize and dissolve as liberated cations of said first chemical species into said reactant volume of said second chemical species in immediate contact with said anode of said first chemical species, liberating cations of said first chemical species tend to displace said reactant volume of said second chemical species away from said surface of said anode of said first chemical species, thus reducing said chemical species disparity, gravity by way of positive or negative buoyancy forces tending to migrate said liberated cations of said first chemical species away from said anode of said first chemical species, thereby restoring said relatively large chemical species disparity between said surface of said anode of said first chemical species and said reactant volume of said second chemical species.

* * * * *